(12) United States Patent
Manton et al.

(10) Patent No.: US 12,744,783 B1
(45) Date of Patent: Sep. 22, 2026

(54) PROTECTED REMOTE DISTRIBUTION OF ARTIFICIAL INTELLIGENCE AGENTS USING SECURE TUNNELS

(71) Applicant: Airia LLC, Alpharetta, GA (US)

(72) Inventors: John Manton, Alpharetta, GA (US); Gregory Roberts, Dunwoody, GA (US)

(73) Assignee: Airia LLC

( * ) Notice: Subject to any disclaimer, the term of this patent is extended or adjusted under 35 U.S.C. 154(b) by 0 days.

(21) Appl. No.: 19/339,138

(22) Filed: Sep. 24, 2025

(51) Int. Cl.
*H04L 9/40* (2022.01)
*G06F 21/62* (2013.01)

(52) U.S. Cl.
CPC .......... *H04L 63/10* (2013.01); *G06F 21/6245* (2013.01); *H04L 63/02* (2013.01)

(58) Field of Classification Search
CPC ...... H04L 63/10; H04L 63/02; G06F 21/6245
See application file for complete search history.

(56) References Cited

U.S. PATENT DOCUMENTS 6,513,068 B1 * 1/2003 Jones ...................... A63F 13/30 709/236
8,805,947 B1 8/2014 Kuzkin et al.
9,141,823 B2 9/2015 Dawson
10,997,559 B1 5/2021 Hoehnen et al.
11,329,998 B1 5/2022 Shahidzadeh et al.
11,783,062 B2 10/2023 Lounsberry
11,829,952 B1 11/2023 Hoehnen et al.
12,003,660 B2 6/2024 Bernardi
12,041,169 B2 7/2024 Jung et al.
12,081,424 B1 9/2024 Kottapalli et al.
12,130,917 B1 10/2024 Yeung et al.
12,149,555 B2 11/2024 Yellapragada et al.
12,166,785 B2 12/2024 Yellapragada et al.
12,267,345 B1 4/2025 Erlingsson et al.
12,282,719 B1 * 4/2025 Fedoruk ................. G06F 30/27
12,299,133 B2 5/2025 Yellapragada et al.
12,307,299 B1 * 5/2025 Elbadrashiny ........ G06F 9/5038
12,321,725 B1 6/2025 Wilson et al.
(Continued)

OTHER PUBLICATIONS

Howarth (Introducing Simulations: End Manual Bottlenecks in AI Agent Testing, Aug. 26, 2025, 20 pages) (Year: 2025).*
(Continued)

*Primary Examiner* — Oleg Korsak
(74) *Attorney, Agent, or Firm* — Clayton, McKay & Bailey, PC

(57) ABSTRACT

Systems are disclosed for securely deploying artificial intelligence ("AI") agents to remote device environments over secure connections. A cloud connector delivered to the remote device authenticates to a platform connection manager, which opens a first secure tunnel without the need for opening additional ports at the remote device. The AI platform receives a request to execute an AI agent and determines a compliance status for the remote device by applying security rules. Based on the status and the request, the platform modifies a manifest file of the AI agent to identify local agent objects (e.g., an AI model, vector database, or dataset) and queries the device to confirm access. The AI platform then transmits the manifest to the remote device, where an agent executor runs the agent according to the manifest. Execution records are returned over the secure tunnel to provide centralized oversight and auditability.

20 Claims, 17 Drawing Sheets

(56) References Cited

U.S. PATENT DOCUMENTS

| | | | |
|---|---|---|---|
| 12,406,207 | B2 | 9/2025 | Turley et al. |
| 12,425,203 | B2 | 9/2025 | Chang et al. |
| 12,489,818 | B2 | 12/2025 | Letort et al. |
| 12,519,840 | B1 | 1/2026 | Abotchie |
| 12,562,968 | B1 | 2/2026 | Morgan et al. |
| 12,568,091 | B1 | 3/2026 | Morgan et al. |
| 12,574,336 | B1 | 3/2026 | Morgan et al. |
| 12,592,823 | B1 | 3/2026 | Manton et al. |
| 2020/0195495 | A1 | 6/2020 | Parker et al. |
| 2021/0201646 | A1* | 7/2021 | Shelton, IV ......... A61B 90/361 |
| 2022/0116736 | A1 | 4/2022 | Williams et al. |
| 2024/0039916 | A1 | 2/2024 | McPeak et al. |
| 2024/0069500 | A1 | 2/2024 | Sung et al. |
| 2024/0298194 | A1* | 9/2024 | Mueck .................. G06N 20/00 |
| 2024/0388551 | A1 | 11/2024 | AlFardan |
| 2024/0414211 | A1 | 12/2024 | Boyer et al. |
| 2025/0055847 | A1 | 2/2025 | Balla et al. |
| 2025/0126127 | A1 | 4/2025 | Jakhar et al. |
| 2025/0126128 | A1 | 4/2025 | Jain et al. |
| 2025/0254495 | A1 | 8/2025 | Williams et al. |
| 2025/0321992 | A1 | 10/2025 | Madisetti et al. |
| 2025/0371317 | A1* | 12/2025 | Thompson, III ....... G06N 3/006 |
| 2025/0392605 | A1 | 12/2025 | Lu et al. |
| 2026/0024037 | A1 | 1/2026 | Mystetskyi et al. |
| 2026/0089195 | A1 | 3/2026 | Xiong et al. |
| 2026/0122112 | A1 | 4/2026 | Abotchie |

OTHER PUBLICATIONS

Prabhakar (Model Context Protocol (MCP)—The Integration Fabric for Enterprise AI Agents, 39 pages, Aug. 17, 2025) (Year: 2025).*

Jack Wotherspoon, "Build and Deploy a Remote MCP Server to Google Cloud Run in Under 10 Minutes", Retrieved From https:// cloud. goog le. com/bl og/topics/devel opers-practi tioners/bu i Id-and-deploy-a-remote-mcp-server-to-goog le-cl oud-ru n-i n-u nder-1 0-minutes, Published Jun. 17, 2025 (Year: 2025).

* cited by examiner

PROTECTED REMOTE DISTRIBUTION OF ARTIFICIAL INTELLIGENCE AGENTS USING SECURE TUNNELS

BACKGROUND

Enterprises increasingly deploy artificial-intelligence ("AI") agents that must interact with resources inside private networks, such as on-premises models, vector databases, file systems, identity stores, and business applications. Conventional integration mechanisms typically rely on inbound connectivity into the private network through virtual private networks ("VPNs"), reverse proxies, port-forwards, jump hosts, or exposed webhooks. These approaches expand the attack surface, complicate change control, and require firewall exceptions. Clients are often hesitant to make these sorts of changes, leading to limited AI agent connectivity and, correspondingly, limited AI agent functionality.

Some systems attempt to avoid inbound exposure by collocating the agent inside the customer network and letting it call out to cloud services. While this eliminates open ports, it introduces other issue. These include long-lived application programming interface ("API") keys and tokens distributed across headless processes, weak rotation hygiene, and limited centralized governance over what the AI agent may call and what it may exfiltrate. In practice, these AI agents tend to accumulate broad roles for convenience, leading to management difficulties and hampering forensic accountability.

Modern agent frameworks also standardize connectivity to external "tools" (e.g., code execution, file I/O, HTTP calls). In such environments, tool supply-chain risk is significant: tools can be replaced, upgraded, or misconfigured without rigorous review; community-hosted endpoints may disappear ("rug pull") or change behavior; and signed provenance or attestation is rarely enforced. When transport layers use streaming protocols (e.g., SSE/WebSocket) without strict TLS and origin controls, man-in-the-middle exposure, downgrade, or cross-origin data leakage becomes possible.

Even where local, STDIO-style transports are used to avoid listening ports, a subprocess that the agent controls remains a powerful capability: it can read environment variables, traverse the file system, and emit untrusted outputs that upstream components may treat as trusted. Conventional systems generally lack hardened containment (e.g., mandatory access controls, egress allow-listing, or anti-seep controls for secrets) and lack continuous tamper detection for the executable or its configuration. When such a subprocess is swapped or wrapped by an attacker, it can elevate privileges, pivot to parent processes, or silently relay data off-network.

A separate and growing problem is content-borne attack: agent inputs (prompts, retrieved documents, tool responses) routinely carry prompt-injection, data exfiltration instructions, jailbreaks, or policy-evasion payloads. Conventional defenses focus on upstream filtering of user prompts, but often ignore guardrails on the outbound side. For example, current systems do not prevent the AI model or tool from returning secrets, internal system prompts, regulated content, or personal data. Without such guardrails, an attacker can use innocent-looking inputs to coerce the agent to disclose sensitive information or to invoke destructive tools. Most enterprises are not equipped to detect these types of attacks, which again deters the enterprises from running AI agents that effectively utilize resources of the enterprise's private networks.

Reliability and operations present additional shortcomings. Conventional client-cloud integrations rarely accommodate data-locality and tenancy constraints. Multi-tenant gateways can inadvertently mix logs or caches across tenants; retrieval-augmented generation ("RAG") layers may cache embeddings or snippets outside approved regions; and data loss prevention ("DLP") rules are not consistently enforced at both the token stream and tool-I/O boundaries.

Accordingly, there is a need for systems and methods that enable secure connections between AI agents and remote device infrastructure, with redundant connection paths, and with guardrails to ensure secure operation.

SUMMARY

Examples described herein include systems and methods that allow local AI agents, such as AI agents that fully or partially execute on-premises at a remote device, to interact securely with AI models, vector databases, datasets, SQL servers, or other AI agents.

In an example, an AI platform transmits a cloud connector to a remote device, which may be a user device or a customer server. The cloud connector executes at the remote device and sends an authentication request to a connection manager of the AI platform. The connection manager responds by opening a secure tunnel between the remote device and the platform. Over this tunnel, the platform receives a request from the remote device to generate an AI agent. The platform generates a manifest file that identifies one or more agent objects within the remote device network, such as an AI model, a dataset, or a vector database. The platform transmits the manifest file and an agent executor over the secure tunnel to the remote device. The agent executor executes the AI agent according to the manifest file, and the cloud connector transmits subsequent requests associated with execution of the AI agent.

In certain implementations, requests sent by the remote device may be modified by guardrails before they are returned over the tunnel for further execution of the AI agent. The guardrails can detect prompt injection, confidential information, or personally identifiable information. The request may represent an input to the AI agent, and the modified request can be utilized during execution of an agent object. In other cases, the request may represent an output of an agent object, and the sanitized request can support continued execution of the AI agent. The system may determine an operation to perform on a request by correlating an identifier in the request with entries in the manifest file. The manifest file can specify operations associated with identifiers and may also record which guardrails apply to particular agent objects.

In some aspects, the AI platform transmits a management profile to the remote device. Conditional operation of the agent executor can be based on compliance with the management profile by the remote device or by a user device that interacts with the AI agent. The management profile can define which guardrails are invoked. The manifest file may identify additional agent objects that execute at the AI platform and can be configured so that requests from the remote device are utilized in execution of those platform-based agent objects. The manifest file may be generated automatically based on identification and selection of agent objects through a user interface. The user interface can display available agent objects within the remote device network and also present options to select external agent objects. The selection may be used to configure the AI agent with multiple objects that span local and cloud-based environments.

In some implementations, deployment of the AI agent may be contingent on simulated execution at the AI platform. The simulation can involve displaying a user interface that receives inputs for the AI agent and displays outputs corresponding to the inputs. Logging functions may record requests from the agent executor as well as contextual information, such as the identity of a user and the AI agent, transmitted over the secure tunnel. In another example, a non-transitory computer-readable medium stores instructions that, when executed by one or more processors, cause the processors to transmit cloud connectors to remote devices, open secure tunnels, generate manifest files, provide agent executors, and process requests and outputs with guardrails. A system comprising at least one processor and at least one non-transitory medium can execute such instructions to securely deploy AI agents to remote device environments.

In some examples, these features can facilitate deployment and secure execution of AI agents across remote device and platform environments. Guardrails may improve protection against prompt injection, confidential data exposure, and unauthorized disclosure of personal information. Centralized logging of requests and contextual information can provide oversight and accountability. The use of manifest files and management profiles may enable consistent configuration of agent objects and policies across distributed environments. Simulated execution can reduce operational errors before deployment. Redundant secure tunnels and packaged connectors may improve reliability and scalability. Together, these features can address deficiencies in conventional client-cloud integrations, including weak governance, insecure deployment pipelines, and limited fault tolerance.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a hardware-based processor that executes instructions to carry out the stages described.

Both the foregoing general description and the following detailed description are exemplary and explanatory only and are not restrictive of the examples, as claimed.

DESCRIPTION OF THE EXAMPLES

Figure 1A:
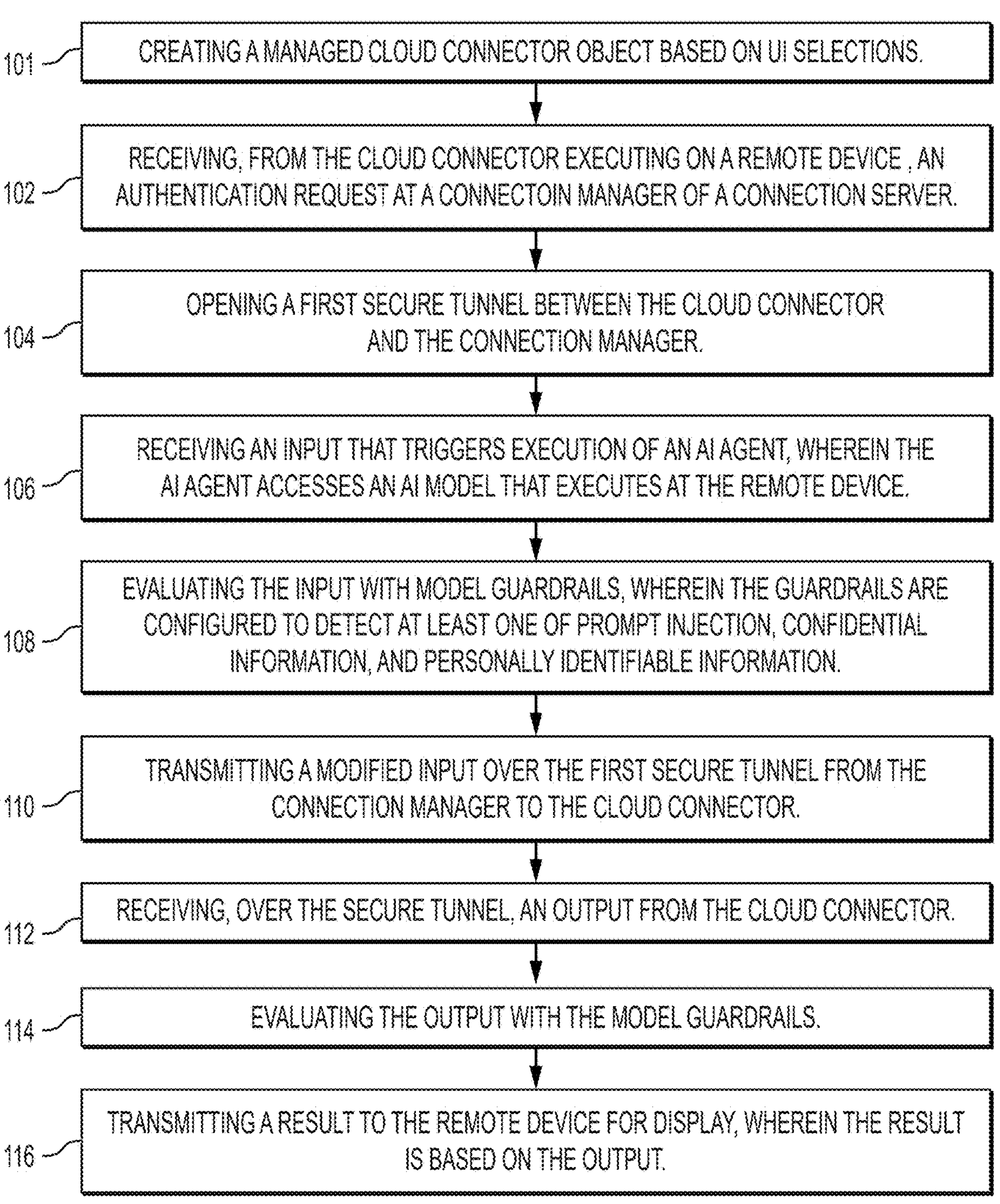
FIG. 1A is a flowchart of an example method for secure cloud connections for AI agent access to remote device resources.

Reference will now be made in detail to the present examples, including examples illustrated in the accompanying drawings. Wherever possible, the same reference numbers will be used throughout the drawings to refer to the same or like parts.

Examples below relate to systems and method for distributing AI agents to a remote device from an AI platform. An example method is described in FIG. 1C and FIG. 4. The remote device can download a cloud connector from the AI platform. The cloud connector can be executable code that is configured to contact the AI platform to request a secure connection. The request can be authenticated, and then then a secure tunnel (e.g., a socket connection) can open. Since the remote device originates contact, no firewall ports need to be opened at the remote device. The secure tunnel can then be utilized by the AI platform to query which resources are available at the remote device, modify a manifest file accordingly, and send the manifest file to the remote device for guiding AI agent execution. The resources can include tools, AI models, data sources, code blocks, and the like.

AI Agents are a configurable software system that performs tasks using artificial intelligence components to achieve specific goals. These agents can be backend-focused "AI Pipelines" processing data without user interaction, or user-facing "AI Assistants" providing conversational interfaces. AI Agents integrate various components (i.e., agent objects) including AI Models, Integrators, Data Sources, Tools, Prompts, Code Blocks, Datasets, Routers, Memory Objects, and others according to defined workflows and rules specified in their "Manifest Files."

An AI platform can allow users to create, modify, and deploy AI agents for execution. The AI agent can attempt to access various tools that can access user accounts. This can require user authentication. Many such tools are accessed through interaction with MCP processes. The AI agent can utilize an MCP client for communicating with the MCP process.

An MCP process can be an MCP server or a one-shot task, such as running code of a tool. Either type of MCP process can run in a standard "streaming" mode where a nano sandbox is created that persists after one command, or in a one-to-one ephemeral container that is terminated after an output is received for the single command. The nano sandbox is a secure, isolated environment responsible for safely executing untrusted processes. In this case, an MCP process executes in the nano sandbox. The nano sandbox mediates communication between the SSE bridge and the actual MCP process. The stages can be performed by an AI platform or a connection server (e.g., gateway server) associated with the platform.

MCP helps build AI agents and complex workflows on top of LLMs. LLMs frequently need to integrate with data and tools, and MCP provides a growing list of pre-built integrations that an LLM can directly plug into and the flexibility to switch between LLM providers and vendors.

MCP clients are protocol clients that typically maintain one-to-one connections with servers. MCP Servers are lightweight programs that expose specific capabilities through the standardized Model Context Protocol. Local Data Sources can include a user's computer files, databases, and services that MCP servers can securely access. Remote Services are external systems available over the internet (e.g., through APIs) that MCP servers can connect to.

An MCP client can communicate with the gateway or AI platform for purposes of executing an MCP process. The MCP client can execute remotely from the gateway and can be an AI agent, frontend interface (potentially user-facing), or orchestrator, that sends commands to MCP servers and handles their responses. The MCP client can interact with the MCP server to access tools, prompts, and datasets of the MCP server. A tool can be a modular software service or component that performs one or more tasks outside of an AI model's or AI agent's native capabilities. Tools can perform specific tasks, such as running code, querying a database, calling an application programming interface ("API"), generating or transforming a file, and the like. Example tools include a SALESFORCE tool, a file writer tool, a weather tool, and OUTLOOK tool, among others. Tools can serve various purposes, including system operations (executing commands, reading and writing files, managing processes, system monitoring), API integrations (fetching web content, querying databases, interacting with cloud services, social media integration), and data processing (data cleaning, format conversion, visualization generation, statistical analysis).

Tools are a powerful primitive that enables servers to expose executable functionality to MCP clients. Through tools, LLMs can interact with external systems, perform computations, and take actions in the real world. Tools are designed to be model-controlled, meaning that tools are exposed from servers to clients with the intention of the AI model being able to automatically invoke them (with a human in the loop to grant approval). Each tool is defined with a name (i.e., a unique identifier for the tool), schema (i.e., the parameter structure using JSON Schema), description (i.e., text explaining the tool's purpose and usage), and examples (i.e., sample usage scenarios to guide LLMs).

Tool annotations provide additional metadata about a tool's behavior, helping clients understand how to present and manage tools. Annotations include title (a human-readable title for the tool, useful for UI display), readOnlyHint (if true, indicates the tool does not modify its environment), destructiveHint (if true, the tool may perform destructive updates, only meaningful when readOnlyHint is false), idempotentHint (if true, calling the tool repeatedly with the same arguments has no additional effect, only meaningful when readOnlyHint is false), and openWorldHint (if true, the tool may interact with an "open world" of external entities).

Prompts enable servers to define reusable prompt templates and workflows that MCP clients can easily surface to users and LLMs. They provide a powerful way to standardize and share common LLM interactions. Prompts are designed to be user-controlled, meaning they are exposed from servers to clients with the intention of the user being able to explicitly select them for use.

Prompts can be defined with a name (unique identifier for the prompt), description (explains the prompt's purpose), arguments (parameters that can be provided to customize the prompt), and template (the actual prompt content, which can include arguments).

Transports in MCP provide the foundation for communication between clients and servers. A transport handles the underlying mechanics of how messages are sent and received. MCP includes two standard transport implementations. STDIO transport enables communication through standard input and output streams. This is particularly useful for local integrations and command-line tools. STDIO is used when building command-line tools, implementing local integrations, needing simple process communication, or working with shell scripts. Server-Sent Events ("SSE") transport enables server-to-client streaming with HTTP POST requests for client-to-server communication. SSE is a unidirectional communication protocol where the server streams text-based updates to the client using the HTTP content type.

FIG. 1A is a flowchart of an example method for secure cloud connections for AI agent access to client resources. At stages 102 and 104, a secure tunnel can be established between a remote device and an AI platform (which can include a gateway server). This can be done without compromising firewall integrity at the remote device.

At stage 101, the AI platform can create a managed cloud connector object. The managed cloud connector object can be created within a UI of the AI platform. An administrator can select a group to which the managed cloud connector object will belong. The AI platform can create the managed cloud connector object, including generating a key, such as a token, that can be copied and utilized at the remote device once the corresponding cloud connector is installed there. The managed cloud connector object can be displayed in the UI, with an option to download a cloud connector to the remote device from which the user is accessing the UI.

The cloud connector can be a secure background service daemon that enables communication between private networks and the AI platform. The cloud connector can create a secure connection between private applications and the AI platform without requiring direct internet exposure. The cloud connector establishes outbound connections only, with no need to open inbound internet ports. The cloud connector also supports multiple connection server deployments with automatic load balancing, and can be selectively downloaded for different platforms, such as WINDOWS, LINUX, and macOS.

The cloud connector can be created based on the managed cloud connector object, which again is created in advance based on UI selections. The UI is generated by the AI platform. The UI can include selections for creating cloud connectors and downloading cloud connectors. The act of creating a cloud connector can cause the AI platform to assign a key to the cloud connector. The UI can display the key, which operates as the client-side key in an encryption key pairing, in an example.

In one example, selecting to download a cloud connector results in downloading a cloud connector installer. The cloud connector installer can execute on the remote device, causing installation of an executable cloud connector. The cloud connector can be based on the managed cloud connector object, utilizing the key generated at the AI platform, and being installed to operate with the operating system ("OS") selected by the downloading user.

In one example, the cloud connector installer can also comprise a command that causes the remote device or a container environment, such as docker, to reach out to a location for downloading the cloud connector installer. This can include a command to a terminal application that controls some aspect of the OS, causing the remote device to retrieve the installer or cloud connector. Alternatively, the command can be to a docker environment, causing that environment to retch the cloud connector installer.

The UI used to create and download the cloud connector may also generate per-connector policies. These can include domain allow-lists for egress, maximum payload sizes, and logging levels. The cloud connector policies can be enforced by the connection manager. The policies can be embedded as a signed policy bundle in the connector package. During authentication, the connection manager can verify the bundle's signature and apply the policy server-side, ensuring that the remote device and platform agree on the same enforcement posture before any agent object can be invoked.

The AI platform can instantiate multiple connection servers that listen for authentication requests from remote devices. A connection server can execute a connection manager that interfaces with the cloud connector. The connection manager can load balance communications between multiple cloud connectors in an example.

At stage 102, the connection server or connection manager receives an authentication request from a cloud connector. The cloud connector executes at the remote device and makes the authentication request. In one example, the authentication request can include a short-lived proof-of-possession token that is bound to a tenant identifier and the remote device's fingerprint. The connection manager can validate certificate chains, require mutual TLS with certificate pinning to a platform-controlled certificate authority, and enforce revocation checks. To resist replay, the request can carry a nonce and monotonic timestamp. The connection manager can reject out-of-window or previously seen nonces. A successful exchange can yield an ephemeral session credential used only to derive secure tunnel keys, after which the bootstrap token is discarded, reducing key persistence on the remote device.

At stage 104, the connection server can open a first secure tunnel between the cloud connector and the connection manager. This can be done without modifying which firewall ports are open at the remote device. Instead, the secure tunnel can be a socket connection initiated by the cloud connector at the remote device.

The first secure tunnel can be one of multiple secure tunnels maintained between the remote device and the connection server. For example, multiple cloud connectors can be downloaded as a package by the remote device. These cloud connectors can be designed to operate with the same cloud network, such as AMAZON web services versus AZURE. The connection server can include one or more servers. When one secure tunnel closes, the redundancy can allow the remote device to utilize another of the open secure tunnels.

The cloud connector and connection manager can encrypt traffic in both directions based on the key. For example, connection string information can be encrypted and decrypted upon reception.

The tunnel can multiplex logically distinct substreams, such as a control plane, data plane, and a logging or telemetry channel. This can be done over a single socket, with per-stream flow control and backpressure. Heartbeats and idle timeouts can be enforced to detect path degradation. The tunnel can proactively rotate keys at fixed token budgets (e.g., after threshold traffic levels or times) to constrain cryptanalytic windows.

In some cases, the remote device maintains multiple simultaneous secure tunnels (e.g., through separate cloud connectors). The manifest file can instruct the agent executor to segment traffic by sensitivity or workload, or this can be automated by the connection manager. If one tunnel degrades, the connection manager can fail over transparently.

At stage 106, the gateway server (or other AI platform server) can receive an input that triggers execution of an AI agent. The input can be received from the remote device over the secure tunnel at an example. The connection server and connection manager can forward the input to an agent executor, in an example. The agent executor can execute the AI agent in accordance with a manifest file. The manifest file can describe agent objects and their flow of execution.

In this example, the AI agent can primarily execute at the AI platform. For example, the endpoint where the input is received can be a network location of the AI platform. An agent executor can utilize the input in executing one or more agent objects defined as part of the AI agent in the manifest file. However, the manifest file can also indicate other network locations for executing agent objects, in which case the agent executor can make network calls to those locations. The secure tunnel can allow operation of platform-based AI agents that execute agent objects at the remote device, such as at a customer server or a user device, such as a cell phone.

In one example, the AI agent can be configured to access an AI model that executes at the remote device. The manifest file can identify the AI model at the remote device, such as with an endpoint or identifier. The cloud connector can receive a request to execute agent objects (or subtasks) in relation with the AI model, and a local execution environment at the remote device can invoke the corresponding processes. For example, an agent executor at the remote device can handle execution of the agent objects there.

Prior to the evaluation at stage 108, the agent executor can apply schema-level prechecks. These can include JSON Schema validation for structured inputs and token-length caps per role (e.g., system vs. user tokens). Where the input contains URLs or file references, a domain allow-lists and content-type limits can be enforced, so that a later agent object cannot be coerced to retrieve untrusted content. These prechecks can feed their results into the guardrail pipeline described below.

At stage 108, prior to sending the input to the AI model at the remote device, the agent executor at the AI platform can invoke evaluation of the input with model guardrails.

The model guardrails can be one type of security rules that the AI platform can apply to various inputs and outputs of an AI agent. For example, specialized guardrails can be used before and after agent object execution to prevent malicious activities and to prevent the disclosure of sensitive information.

In this example, the model guardrails are configured to detect prompt injection and personally identifiable information ("PII"). The guardrails can compare input and output strings against trained PII detection models, as well as pattern-matching rules (e.g., regular expressions for Social Security numbers, credit card formats, addresses, and phone numbers). When PII is detected, the guardrails may sanitize the data by redaction, pseudonymization, or replacement with anonymized placeholders. This prevents inadvertent disclosure of sensitive information both in intermediate outputs exchanged between agent objects and in final outputs transmitted for client display. In some examples, a management profile may specify which categories of PII are blocked, which are transformed, and which are passed through with audit logging.

In some examples, prompt injection detection guardrails can include trained classifiers and rule-based detectors that analyze both the surface form and the semantic intent of the input. The guardrails can detect adversarial instructions that attempt to coerce the AI agent into disclosing hidden prompts, revealing system configuration, or executing destructive tool commands. The guardrails may maintain allow-lists of approved tool invocations and block-lists of sensitive instructions, such as those instructing the model to export local files or to reveal authentication material. By applying such prompt-aware filters both before and after agent object execution, the system can prevent malicious payloads from propagating across agent objects.

The model guardrails can be configured to apply at multiple boundaries in the agent execution lifecycle. For example, pre-execution guardrails may intercept inputs received by the agent executor before the inputs are dispatched to a first agent object. Such pre-execution guardrails can include (i) lexical or semantic scanning of natural-language prompts to detect malicious injection payloads, (ii) token-level filtering of embedded instructions that attempt to override system prompts or invoke unauthorized tools, and (iii) data-loss prevention rules to block transmission of strings resembling credentials, payment card data, or government-issued identifiers. Post-execution guardrails can similarly intercept the outputs of each agent object prior to utilization by downstream agent objects or external display. These post-execution guardrails can apply normalization, redaction, or transformation operations that enforce organizational security policies.

Other guardrail functions can include rate limiting, language normalization, schema validation, and policy enforcement tied to the manifest file of the AI agent. For example, the manifest can specify that a particular agent object accessing a vector database is subject to query-length limits and that its output must be passed through a schema validator. The guardrails can thus ensure that only syntactically valid and policy-compliant data are propagated across the AI agent workflow. Guardrail results can be logged together with contextual metadata, thereby providing accountability and enabling retrospective forensic analysis.

The agent executor (or the guardrail evaluation process itself) can modify the input to comply with security rules based on the guardrail evaluation. This can include removing detected prompt injections, replacing the PII, trimming token length, and the like.

The model guardrails can further detect confidential information in the inbound input by comparing against enterprise confidential documents with pattern detectors for structured secrets (e.g., API tokens, private keys, connection strings) and code-aware classifiers that identify proprietary source fragments. Inputs that cross a sensitivity threshold may be blocked, down-scoped (e.g., summarized), or rewritten to placeholders prior to sending the input to any agent object.

At stage 110, the agent executor can cause the connection manager to transmit the modified input over the first secure tunnel for use with the AI agent of the remote device. The modified input is then received at the cloud connector of the remote device, where it is decrypted.

The agent executor at the remote device can then supply the modified input as an input to the AI model. The AI model can be executed locally on the remote device. For example, a small language model ("SML") or large language model ("LLM") can be locally executed. Alternatively, the remote device can make a network call to the AI model using credentials of the remote device. For example, a user's personal account can be used by their user device in contacting the AI model.

In one example, the remote device receives one or both of the manifest and an agent executor. This can ensure that the agent objects executed at the remote device comply with security rules or other requirements of the AI agent. Additionally, the manifest can instruct the local agent executor regarding what information to send back to the AI platform (e.g., gateway server) through the secure tunnel.

At stage 112, the output from the AI model can then be sent back to the AI platform through the secure tunnel. The connection server can receive the output from the cloud connector of the remote device. The manifest can specify evaluation of the output prior to further use.

At stage 114, the agent executor can invoke evaluating the output with the model guardrails. The guardrails can be the same or different as used for the input.

The model guardrails can also be configured to detect confidential information within agent inputs or outputs. Confidential information can include business secrets, proprietary source code, internal system prompts, configuration files, or contractual documents. At the input stage, the guardrails may apply keyword and pattern recognition against a library of enterprise-defined terms, file names, or code identifiers that are designated as restricted. For example, the guardrails can block inputs that attempt to provide an AI agent with unapproved portions of source code or internal financial spreadsheets.

At the output stage, the guardrails can perform semantic classification to determine whether a generated response contains confidential information. Detection mechanisms can include (i) embeddings-based similarity search against a confidential corpus maintained by the enterprise, (ii) entropy and structural analysis to identify outputs that resemble encryption keys, API tokens, or database connection strings, and (iii) comparison against policy-based templates that define which classes of information must never leave the AI platform. If the guardrails detect confidential content, the system may sanitize the output by replacing the confidential segments with placeholders, truncate the response, or block transmission entirely.

In some implementations, confidential-information guardrails may be context-aware, leveraging metadata such as the role of the requesting user, the identity of the agent object, or the target destination of the output. For example, the guardrails may permit disclosure of certain internal identifiers when an output is destined for an authenticated monitoring service, but block the same identifiers when the output is destined for a user-facing chat interface. The management profile of the AI agent can specify such conditional rules, allowing confidential-information detection to be tailored to enterprise policy while still providing flexibility across different workflows.

A result can be formulated based on modifying the output in response to the guardrails evaluation. At stage 116, the result can be transmitted by the connection manager to the remote device for display. The result can be based on the output, either comprising the output or being created based on the output. The remote device can display the output on a screen.

Figure 1B:
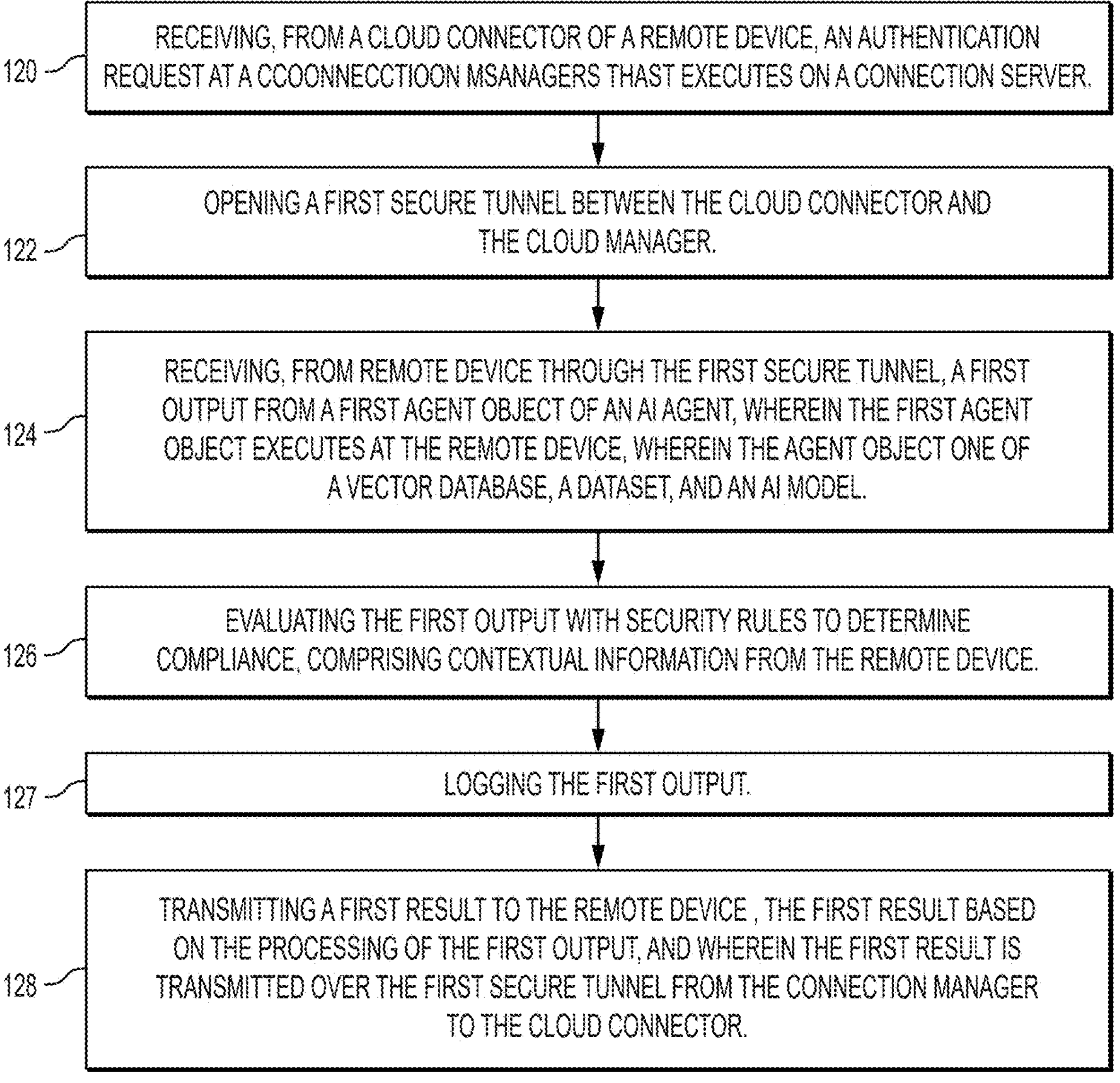
FIG. 1B is a flowchart of an example method for secure cloud connections that provide protection and oversight to remotely executed artificial intelligence AI agents.

FIG. 1B is a flowchart of an example method for secure cloud connections that provide protection and oversight to client-executed artificial intelligence AI agents. In this example, the AI agent can execute at a remote device, but the AI platform can still log activities and apply security rules, keeping remote execution contingent on compliance.

At stage 120, a connection server of an AI platform receives, from a cloud connector executed by a remote device, an authentication request. The authentication request may carry cryptographic tokens, device identifiers, and manifest checksums. A connection manager executing on the connection server verifies the request using certificate chains or short-lived session keys provisioned at connector download time. In some implementations, the connection manager further evaluates posture information about the remote device (e.g., operating system version, patch level, or attestation proofs) before allowing agent execution.

The authentication request is received by a connection manager that executes on the connection server. The connection server can be one of multiple instantiated by an AI platform. Each connection server can listen for requests from cloud connectors at remote devices, and open secure tunnels based on authenticating the request.

In one example, the connection manager or agent executor at the AI platform (e.g., gateway server) checks to determine whether the remote device complies with security rules prior to allowing the execution of a remote AI agent.

At stage 122, the connection server can open a first secure tunnel between the cloud connector and the connection manager. In one example, the secure tunnel can be a mutually authenticated transport layer security ("TLS") socket connection initiated outbound from the client side to traverse restrictive firewalls. In addition to confidentiality and integrity, the secure tunnel may enforce replay protection, forward secrecy, and continuous key rotation. Redundancy can be provided by opening parallel tunnels with separate cloud connectors (to the same or separate connection servers), enabling automatic failover or load balancing if one path degrades. In one example, the connection manager manages secure tunnels to multiple connection servers.

In some embodiments, the AI platform provisions multiple cloud connectors to the remote device as a package. The package enables the connection manager to open a second secure tunnel after being contacted by a second cloud connector. The second secure tunnel can be held in reserve for redundancy, selected automatically upon degradation or disconnection of the first secure tunnel, or used actively for load distribution or traffic segmentation (e.g., tool I/O on one tunnel, model tokens on another). The connection manager may maintain correlation identifiers across both tunnels so that downstream logging and guardrail decisions remain attributable to the same user session and AI agent.

At stage 124, the connection server can receive, from the remote device through the first secure tunnel, a first output from a first agent object of an AI agent. Some or all of the AI agent features can execute remotely at the remote device. For example, a first agent object can execute at the remote device. The first agent object can comprise at least one of a vector database, a dataset, and an AI model executing at the remote device.

The first output of the first agent object can represent the output of a beginning or intermediate execution step of the AI agent. Again, a manifest file can define all the agent objects that are executed in a sequence, which can be conditional. The output may include intermediate embeddings, structured query results, or partial inference tokens. Metadata describing the execution context can be attached as headers to facilitate policy enforcement. For example, the metadata can include the identity of the agent object, the manifest reference, and the requesting user.

The received first output may include structured query results, embedding vectors, partial tokens, or file descriptors, and is accompanied by context headers that identify the originating agent object and manifest step. The system can also log the first output and the associated contextual identifiers prior to evaluation so that both pre- and post-sanitization records are available for audit.

At stage 126, an agent executor at the AI platform can evaluate the first output with security rules to determine compliance. The security rules can include guardrails for data leakages, such as for detecting PII, confidential business information, or system prompts. The security rules can also include compliance policy validation, such as checking whether the output aligns with the manifest's schema, allowable response size, or data-type constraints. The security rules can further include behavior anomaly detection, such as lagging unusual query patterns, excessive token counts, or suspicious control characters that may indicate injection attempts. The evaluation of the security rules can take into account the first output and identifiers of the remote device, the AI agent, and the first agent object, along with contextual information about the output, remote device, or a user of the AI agent. This evaluation can combine rule-based filters with machine-learned classifiers and similarity checks against known sensitive documents of an enterprise or customer.

Upon detection, the guardrails can select an enforcement action specified by a management profile or manifest policy, such as redaction with placeholders, truncation to a safe length, or blocking. Guardrail decisions can take into account the type of the first agent object and contextual information from the remote device (e.g., role of the requesting user, device posture, policy tier).

At stage 127, the agent executor can log the first output, a timestamp, and an identification of at least one of a user, the AI agent, and the remote device. By logging outputs from remotely executed agent objects at a centralized location, an master log of various AI agents can be created. The logging subsystem can write to an append-only ledger, optionally signed or hashed for non-repudiation. This ensures that even remote agent object activity contributes to a unified audit trail, providing forensic visibility into distributed agent workflows.

In addition to logging the first output, the platform can generate a master log that aggregates logs for this AI agent and for other AI agents that execute remotely across the tenant. The master log can capture inputs, outputs, enforcement actions applied by guardrails, timestamps, tunnel identifiers, and user/agent identifiers, enabling cross-workflow correlation and enterprise-wide oversight. In some cases, both the first output and the first result are independently recorded with cross-references so that reviewers can reconstruct the precise modifications made by the guardrails.

At stage 128, the connection server can transmit a first result to the remote device. The first result is based on the evaluation of the first output and can be transmitted over the first secure tunnel from the connection manager to the cloud connector. For example, confidential tokens can be redacted, placeholder values substituted, or truncated results returned. The result is transmitted through the secure tunnel from the connection manager to the cloud connector, ensuring that the client receives only policy-compliant outputs.

The first result can also act as a control signal to invoke continued execution of the AI agent at the remote device. For instance, the result may indicate whether subsequent agent objects should be invoked, whether additional guardrail checks are required, or whether execution should be halted due to policy violations. By combining secure tunneling, contextual evaluation, centralized logging, and dynamic feedback, FIG. 1B illustrates how the system provides both protection and oversight for AI agents that partially or wholly execute on client infrastructure.

Figure 1C:
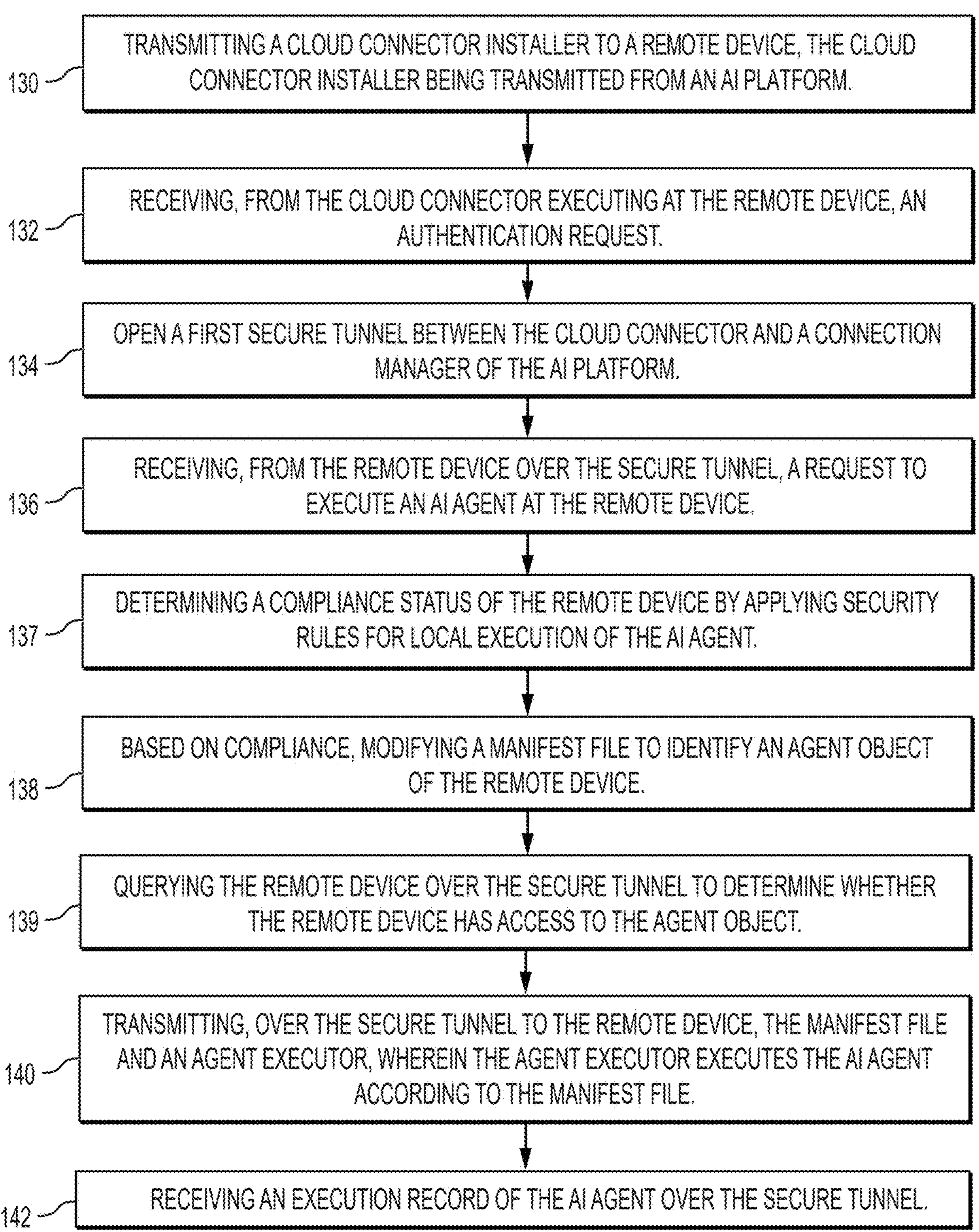
FIG. 1C is a flowchart of an example method for deploying artificial intelligence ("AI") agents over secure cloud connections.

FIG. 1C is a flowchart of an example method for deploying artificial intelligence ("AI") agents over secure cloud connections. In this example, an AI agent is distributed from the AI platform to a remote device for execution at the remote device.

At stage 130, the AI platform transmits a cloud connector to a remote device. For example, within a UI, a user of the remote device can create a new cloud connector and select an option to download it to the remote device. Once downloaded, the cloud connector can execute, contacting the connection server of the AI platform.

The cloud connector can be provisioned as a signed, version-controlled binary that is tied to tenant-specific credentials. Transmission may include checksum verification, expiration metadata, and a bootstrap configuration that specifies which connection servers to contact first. In some cases, the connector is wrapped in an installer package that configures local services, firewall allow-rules for outbound sockets, and rotation intervals for ephemeral tokens. This ensures that the connector is not only downloaded but also installed in a manner that complies with organizational IT policies.

At stage 132, the connection server can receive, from the cloud connector executing at the remote device, an authentication request. The authentication request may include a signed proof-of-possession token, one-time initialization vector, and a device fingerprint. Multi-factor authentication can also be supported, where the connector prompts a user for approval through an out-of-band mechanism (e.g., mobile authenticator application). The connection server can validate the request against an enterprise identity provider, ensuring that only registered devices and users can instantiate secure tunnels.

At stage 134, in response to the authentication request, the connection manager can open a first secure tunnel between the cloud connector and a connection manager of the AI platform. The secure tunnel can use mutually authenticated TLS with short-lived session certificates issued by the platform's internal certificate authority. Replay detection, session resumption control, and continuous rekeying may be employed to minimize cryptographic risk. The connection manager can also multiplex multiple logical streams (e.g., control channel, data channel, logging channel) over a single socket or over additional secure tunnels, reducing overhead while maintaining isolation between functions.

At stage 136, the receiving, from the remote device over the first secure tunnel, a request to execute an AI agent at the remote device. The request can include a manifest reference, policy profile, and desired runtime environment for use at the remote device. For example, the remote device can specify available compute resources or request a nano sandbox to contain the execution. The system can validate the request against tenant policies to ensure that only authorized agent types are deployed.

At stage 137, the agent executor determines a compliance status of the remote device. The compliance status is determined by applying security rules for local execution of the AI agent to the remote device. The agent executor can also assess configuration against a baseline profile, such as ensuring that the remote device enforces disk encryption and keychain protection. Compliance results can be cached for future agent deployments, but are revalidated periodically to detect drift.

In one example, the agent executor can operate conditionally based on remote device compliance with a management profile transmitted from the platform. The management profile can define which security rules and guardrails are invoked for specific agent objects. The security rules can include which inputs require prompt-injection scanning, which outputs require PII or confidential-information redaction, and which tools are allow-listed. If the device posture or user posture changes, compliance status can be recalculated and the AI platform can require additional constraints before execution proceeds.

At stage 138, based on the compliance status and the request, the AI platform modifies a manifest file of the AI agent. The modified manifest file can identify an agent object within a network of the remote device. For example, the compliance check can determine whether the remote device meets security rules required for running the AI agent or particular agent objects locally at the remote device. The agent object can comprise at least one of an AI model, a vector database, and a dataset.

Based on the current compliance status and the configured selection of agent objects, the AI platform can further modify the manifest file by (i) prioritizing a given local agent object relative to a second agent object that executes at the platform, (ii) binding each step to explicit guardrail sets and schema requirements, and (iii) embedding management-profile references that identify which security rules apply per step. If the compliance status subsequently changes, an additional modification to the manifest can be made dynamically, for example substituting a read-only data retrieval step for a previously configured tool or forcing outputs through a stricter redaction path before presentation.

Modification of the manifest can include pruning agent objects that require elevated privileges, substituting alternate execution paths, or inserting additional guardrails for enforcement of sensitive workflows. The guardrails can be enforced either at the remote device or at the AI platform. The modified manifest can include cryptographic identifiers for each agent object, preventing tampering or substitution of components.

At stage 139, the agent executor can query the remote device over the secure tunnel to determine whether the remote device has access to the agent object. For example, before supplying the modified manifest, the query can be part of checking that the AI agent can be executed as specified. This may involve capability discovery, where the remote device reports available models, datasets, or vector databases. The query can return performance metrics (e.g., expected latency, available memory) that allow the AI platform to optimize selection or even placement of agent objects. In some cases, the query triggers a simulated execution, where the device returns metadata about a potential execution without actually invoking the agent object.

Responsive to the query results, the AI platform can determine whether to transmit the agent object itself for local installation or to transmit an object configuration that enables the remote device to interact with an already-present agent object. The object configuration can include an endpoint, credentials, and capability flags. Credentials can be scoped, short-lived, and bound to the secure tunnel session to reduce exposure. Where the query indicates insufficient local capability, the manifest file can be updated to route the relevant step to a second agent object that executes at the platform while preserving downstream guardrail enforcement and logging continuity.

At stage 140, the agent executor (using the cloud manager) can transmit the manifest file over the secure tunnel to the remote device. Another agent executor at the remote device can execute the AI agent according to the manifest file.

The agent executor can be provisioned as a sandboxed binary or container image. The transmission may include signed hashes for verification and may be encrypted at the application layer in addition to the tunnel layer, providing defense-in-depth. On the remote device, the agent executor can launch within a confined runtime (e.g., container or restricted user account) to limit impact in the event of compromise.

At stage 142, the AI platform can receive an execution record of the AI agent over the secure tunnel. This can be used as part of centralized logging, such that the AI platform can track and report on AI agent usage across domains. The execution record may include step-by-step logs, resource consumption statistics, guardrail decision outputs, and a cryptographic signature generated by the remote agent executor. This record can be ingested into a centralized ledger that provides tamper-evident, auditable tracking of distributed agent execution. By correlating execution records with manifest identifiers and compliance assessments, the system can generate detailed reports for administrators and regulators.

Figure 1D:
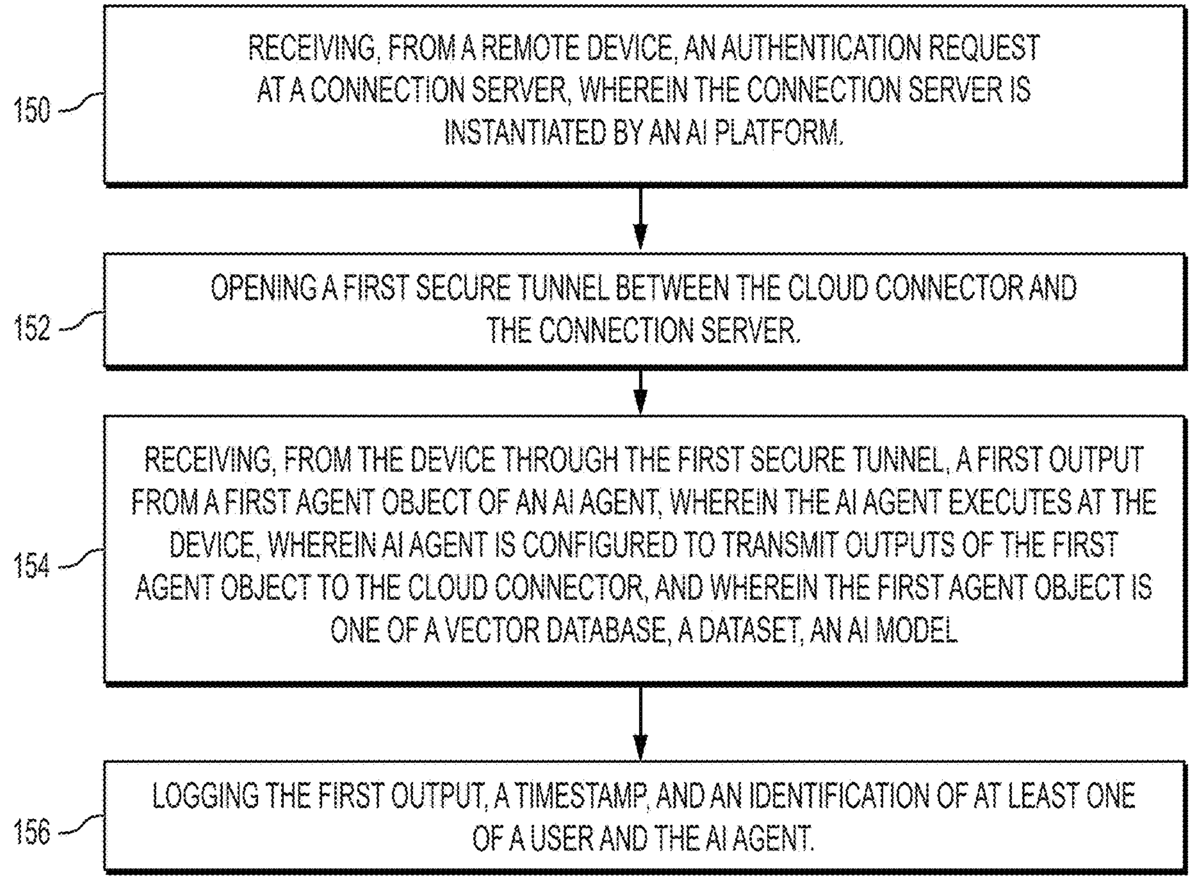
FIG. 1D is a flowchart of an example method for AI agents to utilize remote device-hosted model context protocol ("MCP") tools over secure cloud connections.

FIG. 1D is a flowchart of an example method for logging events at remotely executed AI agents. Stage 150 is similar to stage 120 of FIG. 1B. The cloud connector of the remote device authenticates with the connection server. At stage 152, the secure tunnel is opened, as described for stage 134 of FIG. 1C.

At stage 154, a first output of an agent object is received at the connection server through the secure tunnel, similar to explained with regard to stage 124 of FIG. 1B.

At stage 156, the agent executor of the AI platform (e.g., gateway server) can log outputs of AI agents and agent objects into a centralized master log. The logged outputs may include both intermediate and final values, such as natural language completions, embeddings, classification labels, and probability distributions generated by local or remote AI models. These outputs provide a record of inference decisions, enabling later evaluation of accuracy, bias, and reproducibility. Structured query results, vector similarity search hits, retrieved documents, and analytic computations from datasets or vector databases can also be logged, allowing administrators to trace which records were accessed and ensuring compliance with data locality and regulatory requirements. Outputs can further include inputs and results of external tools, such as API calls, code executions, or file transformations, which confirm that tools executed with expected parameters and returned trustworthy responses. Logging prompt records (e.g., user prompts, system prompts generated from a manifest, and dynamically modified prompts) can allow for detection of adversarial manipulations such as prompt injection attempts. Errors and exceptions raised by agent objects, including runtime errors, malformed outputs, timeouts, or rejected schema validations, may also be captured to support debugging, forensic analysis, and service-level monitoring.

Outputs of security rule and guardrail evaluations can likewise be logged. This can include indications that confidential information, personally identifiable information, or system prompts were detected and sanitized, thereby providing evidence of compliance. Resource and performance metrics, such as CPU utilization, memory usage, latency, token counts, and bandwidth associated with execution of the agent objects, can also be recorded to aid in optimization, anomaly detection, and capacity planning. Each logged output can be accompanied by execution metadata such as session identifiers, user identifiers, agent object identifiers, manifest references, timestamps, and tunnel identifiers, which ensure that each record can be unambiguously attributed to the corresponding user, agent, and execution context.

The master log of outputs may be used for multiple purposes. Logged records can allow forensic reconstruction of agent behavior by replaying prompts, outputs, and tool interactions to analyze incidents or disputes. The log provides artifacts of compliance by documenting detection and sanitization of confidential information and personally identifiable information for regulatory frameworks. Aggregated outputs can support real-time security monitoring to detect anomalous usage, exfiltration attempts, or repeated injection attacks. Developers may use logged embeddings, tool results, and error traces to refine manifests, improve model selection, or resolve integration bugs. Signed logs can create a verifiable record of AI agent activity. This enhances enterprise confidence and supports transparency. By aggregating outputs across multiple AI agents into a unified ledger that includes even AI agents and agent objects that execute on various remote devices. Administrators can correlate workflows across departments, detect cross-tenant interference, and enforce rules. Together, these logging functions ensure that every type of agent object output (e.g., textual, structured, binary, or metadata) is recorded in a way that supports oversight, compliance, and continuous improvement of the AI platform.

Figure 1E:
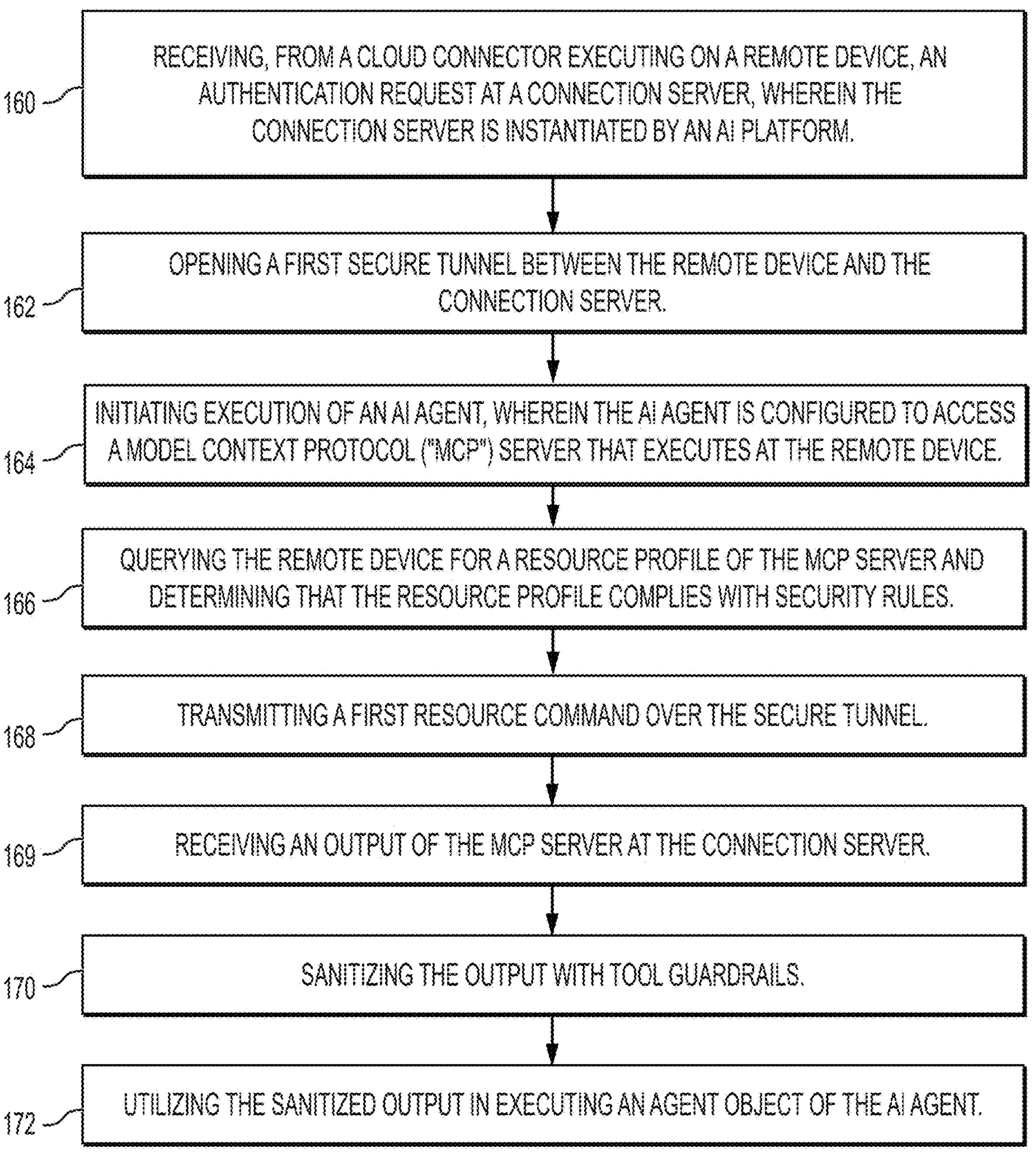
FIG. 1E is a flowchart of an example method for remote device-hosted model context protocol servers with secure tunnel access for AI agents.

FIG. 1E is a flowchart of an example method for AI agents to utilize client-hosted model context protocol ("MCP") tools over secure cloud connections. This example involves an AI agent that executes at the AI platform (e.g., gateway server) and accesses a client-executed MCP server to utilize a tool.

At stage 160, the AI platform receives an authentication request at a connection server. The request is transmitted from a cloud connector executing on a remote device. The connection server can be one of multiple instantiated by an AI platform. This is similar to stage 120 of FIG. 1B. The authentication request can include signed client tokens, device fingerprints, and manifest checksums. The connection server authenticates using certificate chains or ephemeral session credentials. In some examples, remote device posture checks are performed before continuing.

At stage 162, opening a first secure tunnel between the remote device and the connection server, wherein the secure tunnel includes end-to-end encryption of traffic sent over the secure tunnel based on a key that is generated in a user interface ("UI") for creating the cloud connector. This is similar to stage 122 of FIG. 1B. The secure tunnel may employ mutually authenticated TLS with forward secrecy and continuous rekeying.

At stage 164, the agent executor initiates execution of an AI agent. In this example, the AI agent is configured to access an MCP server that executes at the remote device.

The AI platform can provide the execution environment to the remote device, but this is more fully covered in discussion of FIG. 1E. The initiation may include loading a manifest file that specifies MCP tools as agent objects, associating them with security rules (e.g., access policies), and allocating agent executor runtime resources to handle streaming outputs from the MCP server.

At stage 166, the AI platform queries the remote device for a resource profile of the MCP server. The resource profile can be understood as a structured tool specification describing what commands, APIs, or functions the MCP server exposes. The resource profile may be defined in JSON Schema, including tool names, parameter schemas, expected return types, example invocations, and annotations such as destructiveHint or idempotentHint. The resource profile may also indicate execution modes (e.g., whether a tool runs in a persistent nano sandbox session or as a one-shot subprocess), required environment variables, or constraints on input length and output size.

The agent executor determines whether the resource profile complies with security rules. For example, ensuring that only allow-listed tools appear, rejecting tools with excessive privileges, or flagging commands that could exfiltrate secrets. In certain implementations, the agent executor may perform static analysis of the schema to identify parameters that could enable arbitrary code execution, file system traversal, or unrestricted network calls. The resource profile can also be versioned and cryptographically signed so that the AI platform can verify its provenance and prevent substitution of rogue tool specifications. In some cases, the profile is compared against previously cached profiles to detect unauthorized modifications or upgrades to the MCP server's tool set. This stage allows the AI platform to build a catalog of usable and policy-compliant MCP commands while excluding unsafe or unapproved capabilities.

At stage 168, in an instance in which the resource profile is determined to be compliant, the agent executor transmits a first resource command over the secure tunnel. The first resource command is destined for the MCP server. The resource command can be encoded in JSON-RPC or another structured protocol, including parameters, session identifiers, and trace metadata. Before transmission, guardrails may normalize parameters, enforce type checks, and redact sensitive values.

At stage 169, an output of the MCP server is received through the secure tunnel or an SSE channel at the connection server. The output can be streamed in tokenized form for long-running processes or delivered as discrete messages for one-shot commands. Contextual headers may accompany the output to indicate the originating tool, execution duration, and resource usage. As will be discussed more regarding FIG. 1F, a header can specify system resources to include in a nano sandboxed environment for use with the MCP server.

At stage 170, the agent executor sanitizes the output with tool guardrails. The tool guardrails are configured to detect at least malicious code and payloads that exceed context window constraints. These guardrails may detect malicious code fragments, injection payloads, or payloads that exceed schema or context-window constraints. For example, outputs containing large base64 blobs, file system paths outside allowed directories, or attempts to echo confidential tokens may be truncated or replaced with placeholders.

At stage 172, the agent executor of the AI platform utilizes the sanitized output in executing an agent object of the AI agent. The agent object can comprise one of an AI model, a data source, a code block, a router object, and an AI tool. By ensuring that only sanitized, schema-compliant outputs are propagated downstream, the system maintains both safety and consistency across complex agent workflows.

Figure 1F:
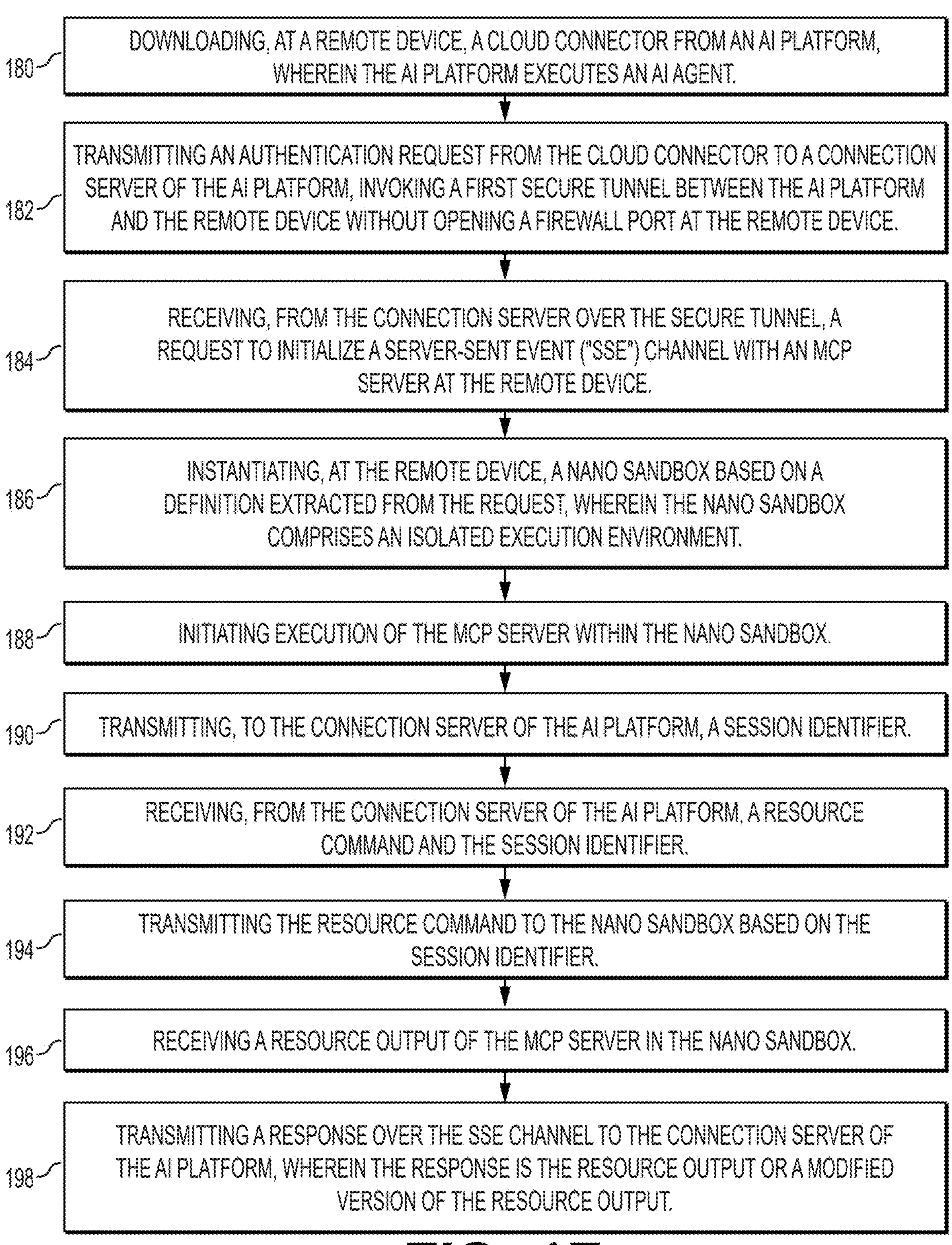
FIG. 1F is a flowchart of an example method for client-hosted MCP servers with secure tunnel access for AI agents.

FIG. 1F is a flowchart of an example method for client-hosted MCP servers with secure tunnel access for AI agents. This example is from the perspective of the remote device, which initiates the secure tunnel. The AI platform executes an AI agent, but the remote device runs a nano sandbox environment for executing an MCP server utilized by the AI agent.

At stage 180, the remote device downloads a cloud connector from an AI platform, wherein the AI platform executes an AI agent.

At stage 182, the remote device transmits an authentication request from the cloud connector to a connection server of the AI platform, invoking a first secure tunnel between the AI platform and the remote device without opening a firewall port at the remote device.

At stage 184, the remote device receives, from the connection server over the secure tunnel, a request to initialize an SSE channel with an MCP server at the remote device. The remote device can execute an application supplied by the AI platform. The application can provide an SSE bridge that is used to create an MCP execution environment and communicate with the cloud connector. The SSE bridge can identify a request to access an MCP server, which can also include a request to initialize an SSE channel with an MCP server. In one example, the secure tunnel comprises the SSE channel, although a separate SSE channel can also be created and utilized. The request is sent from an MCP client that executes at the AI platform (e.g., at a gateway server). The MCP client can generate MCP-compliant commands in association with an AI agent. The SSE bridge at the remote device can be part of an MCP orchestrator that allows for managing inputs and outputs to the MCP server.

In one example, the MCP client can initiate the request to the SSE endpoint with a GET request. The Get request can include a nano sandbox definition in the header.

Based on the header, the definition, or a command included with the GET request, the SSE bridge can select a mode of operation for a nano sandbox. In a standard first mode, the SSE bridge opens an SSE channel with the MCP client and maintains the nano sandbox for ongoing interactions in a session with the MCP client. In a second "one-to-one" mode of operation, the SSE bridge can utilize an ephemeral nano sandbox that the SSE bridge terminates after the MCP process responds to the request from the MCP client. In this case, the request can include a one-off command that is executed in the nano sandbox.

At stage 186, the remote device (using the SSE bridge) can instantiate, at the remote device, a nano sandbox based on a definition extracted from the request. The nano sandbox is an isolated execution environment and can be ephemeral. The specific environment can be defined by the definition of the request of stage 184. The definition can be included in a hypertext transfer protocol ("HTTP") header of the request. The request can be an HTTP post from the MCP client.

The SSE bridge can create the nano sandbox using a bubblewrap command that restricts file system access to one or more specified directories. The bubblewrap command can define network access and establish system call filtering for the nano sandbox.

The nano sandboxes can be created inside of a privileged container that runs in Kubernetes. In one example, a web service request creates a nano sandbox and can do so using bubblewrap. Using bubblewrap within the context of a web request, the nano sandboxes can be isolated environments in the kernel with read-only system resources, such as directories, libraries, and files needed to execute the MCP process. Binding read-only system resources can refer to binding a read-only file system, system directory, system library, or system file.

In this restricted environment, a subprocess can execute the MCP process, such as a tool. Input variables can be provided to the nano sandbox. The input can then be used in executing the MCP process. Likewise, other information, such as customer data, can be placed in read-only files and read into variables for execution with the customer script. Customer data can include things such as user name, user ID, email or contact information, role, group identifier, tenant ID, access permissions, previous queries and conversations, recent activity, session history, preferred language and communication style, purchase history, device information, user goals or tasks, feedback, ratings, or user-supplied files. This sort of customer data can be relevant to tool usage.

In one instance, the header definition causes the SSE bridge to instantiate the nano sandbox in a single-command mode. That mode causes the nano sandbox to be created, used, and terminated in response to the command.

In one example, the definition identifies a first tool. The MCP process (i.e., MCP server) can be selected based on the first tool. The nano sandbox can be created to include resources dependencies of the first tool. Different tools can be associated with different resource dependencies. An MCP server can support one or more tools, prompts, and datasets.

At stage 188, the remote device can initiate execution of the MCP server within the nano sandbox. The SSE bridge can launch the MCP server within the nano sandbox. The MCP server can define one or more tools, prompts, and datasets accessible to the MCP client.

After launching the MCP process (i.e., MCP server), the SSE bridge pings the nano sandbox. The nano sandbox returns the ping when the MCP server is initialized. The SSE bridge waits for the returned ping before sending the returning the session identifier to the client.

The SSE bridge can include a timeout threshold for receiving the returned ping. If the threshold is exceeded, the SSE bridge sends a kill signal to the MCP server, which can include attempting to terminate the nano sandbox itself.

When a return ping is received, the SSE bridge can continue setting up the connection with the MCP client at the AI platform. This additional setup can be bypassed in "one-to-one" mode, in one example, since the nano sandbox is destroyed after returning the result.

For standard streaming mode, at stage 190, the SSE bridge can transmit, to the connection server of the AI platform, a session identifier that identifies the nano sandbox. The session identifier can be a message ID in one example. This can allow the SSE bridge to route future commands from the AI platform to the correct nano sandbox and the correct MCP client at the remote device.

At stage 192, the remote device receives, from the MCP client and over the connection server of the AI platform, a resource command and the session identifier. The command can be inspected against security policies, as will be discussed in relation to FIG. 1C. The command can be a remote procedure call ("RPC") encoded in JSON, called a JSON-RPC command.

Using the session identifier, the SSE bridge can forward the command to the nano sandbox at stage 194. The MCP server can utilize STDIO-based communication. Therefore, the SSE bridge can write the command to the STDIN pipe of the nano sandbox, causing the MCP server to execute the command within the nano sandbox.

At stage 196, the SSE bridge can receive a resource output of the MCP server in the nano sandbox by reading from the STDOUT pipe. The SSE bridge receives the output on an STDOUT pipe of the MCP server.

At stage 198, the remote device can transmit a response over the SSE channel to the connection server of the AI platform. The response comprises the resource output or a modified version of the resource output. Again, for one-to-one mode, the SSE channel is optional. Instead of an SSE channel, a JSON-RPC response can be returned from SSE bridge to the MCP client.

When the SSE connection closes or when the one-to-one mode completes, the SSE bridge terminates the MCP server. The SSE bridge can dispose of resources used by the nano sandbox and remove the nano sandbox from memory.

Figure 2:
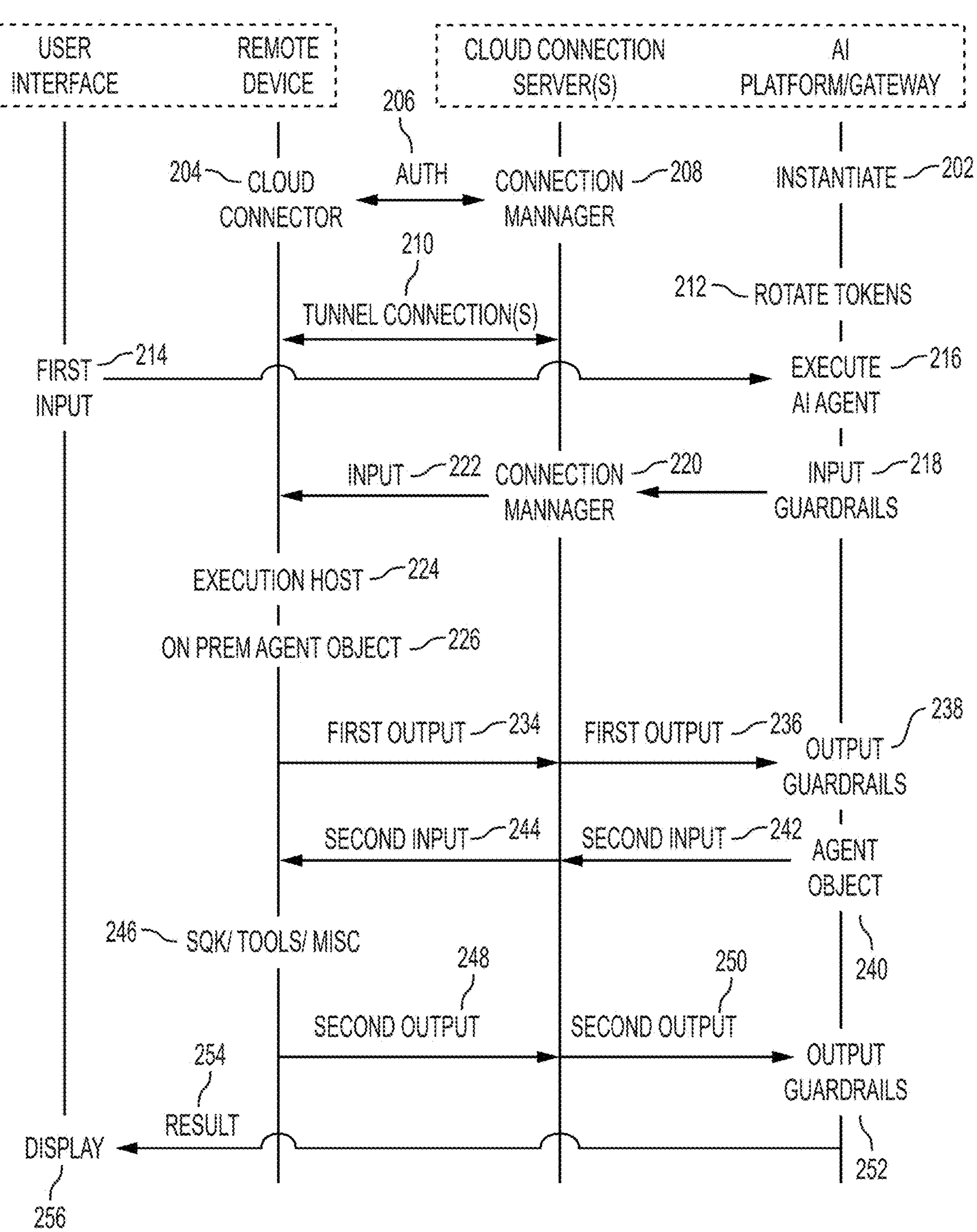
FIG. 2 is a sequence diagram of an example method for secure cloud connections for AI agent access to remote device resources.

FIG. 2 is a sequence diagram of an example method for secure cloud connections for AI agent access to client resources. In this example, a remote device instantiates a cloud connector. The cloud connector can be a provisioned executable tied to tenant credentials, downloaded from the AI platform, and configured to contact one or more connection servers. Instantiation may include verifying a checksum, loading bootstrap configuration (e.g., which gateway server to use), and enrolling the connector with local device services.

The remote device can include the user interface, such as is the case with a cell phone, laptop, personal computer, headset, and the like. Alternatively, the remote device can be a customer server to which a separate device, such as a cell phone, connects. Therefore, the user interface and the remote device are shown in separate columns. Likewise, the AI platform can encompass a gateway server, which itself can execute a cloud connection server. Alternatively, the cloud connection server can be a separate instance from the gateway server. As a result, these are shown in this example sequence diagram as separate columns.

At stage 202, the AI platform, which can include a gateway server, instantiates one or more cloud connection servers. The cloud connection servers can listen for authentication requests from cloud connectors executed at remote devices.

At stage 212, the connection manager can rotate session tokens associated with the secure tunnel and its multiplexed sub-streams to maintain cryptographic freshness. Rotation can be triggered by time (e.g. duration thresholds), volume (e.g., after a threshold number of transmissions or total data), event signals (e.g., device-posture change, policy update), or anomaly detections (e.g., replay suspicion). The new token can be issued as a short-lived, connector-scoped proof-of-possession credential that is channel-bound to the tunnel (e.g., via session identifiers and transcript hashes) and context-bound to the tenant, remote-device fingerprint, and current manifest/version IDs. To avoid disrupting in-flight messages, the platform supports a brief overlap window in which both the prior and next tokens are valid, with sequence numbers and key IDs enabling unambiguous acceptance and audit linkage.

At stage 204, the cloud connector executing at the remote device transmits an authentication request 206 to a connection server of the AI platform. The request is routed to a connection manager, which executes as part of the cloud connection server. Some or all of the connection manager process can execute at the gateway, such that the connection manager can manage multiple connection servers in an example. The request may contain a signed client token, a device fingerprint, and optionally a manifest checksum. The connection manager validates the request against an enterprise identity provider, rotates any initialization tokens, and issues a session credential for tunnel creation at stage 208.

At stage 210, the connection manager opens a secure tunnel with the cloud connector. This can be implemented as a mutually authenticated TLS socket connection, initiated outbound from the remote device so that no inbound firewall ports are opened. The secure tunnel can support multiplexed logical streams, including control, data, and logging, over the same transport. Redundancy is possible by establishing multiple secure tunnels through different cloud connectors and/or connection servers.

At stage 214, the AI platform receives an input that triggers execution of an AI agent. This input may originate from a UI, such as at a user device, or a back-end service of the remote device. The input can be received over the secure tunnel or can be sent directly to a different endpoint associated with the AI agent. If received over the secure tunnel, the connection manager can route the input to an agent executor. Otherwise, the agent executor can listen for the input at the endpoint of the AI agent.

At stage 216, the agent executor executes the AI agent according to a manifest file. The manifest file specifies agent objects, their execution order, conditions for execution, and associated guardrails.

At stage 218, the agent executor applies input guardrails. These guardrails can be based on which agent object is to receive the input. For example, model guardrails can be applied before and after an AI model, whereas tool guardrails can be applied prior to usage of an MCP server. Guardrails can detect prompt injection, malicious code, confidential information, and PII. Pre-execution guardrails can filter tokens, apply lexical and semantic scanning, and enforce schema conformance before the input is sent to any agent object.

At stage 220, the agent executor causes the connection manager to transmit the sanitized (i.e., modified) input to the first agent object. The agent object may be an AI model, a vector database, a dataset, or a client-hosted MCP server. Transmission occurs over the secure tunnel to the cloud connector at stage 222, which decrypts and forwards the request to the appropriate local execution environment.

In this example, the execution environment is represented by an execution host process at stage 224. The execution host can include an agent executor that receives some or all of the manifest file information.

On-premises agent objects can be located at various remote device-accessible endpoints, tracked by the execution host. The agent executor at the remote device can identify the correct agent object based on an identifier received from the connection server, which can originate in the manifest file at the AI platform. As is illustrated, the agent objects can include a vector database or data source, an AI model, or an MCP server. These agent objects can have different endpoints and different execution environments.

At stage 226, the remote device executes the agent object with the modified (e.g., sanitized) input. For example, the local AI model may process the prompt, or the vector database may perform a query. The execution produces a first output, which can include embeddings, structured query results, partial tokens, or file data.

Figure 5:
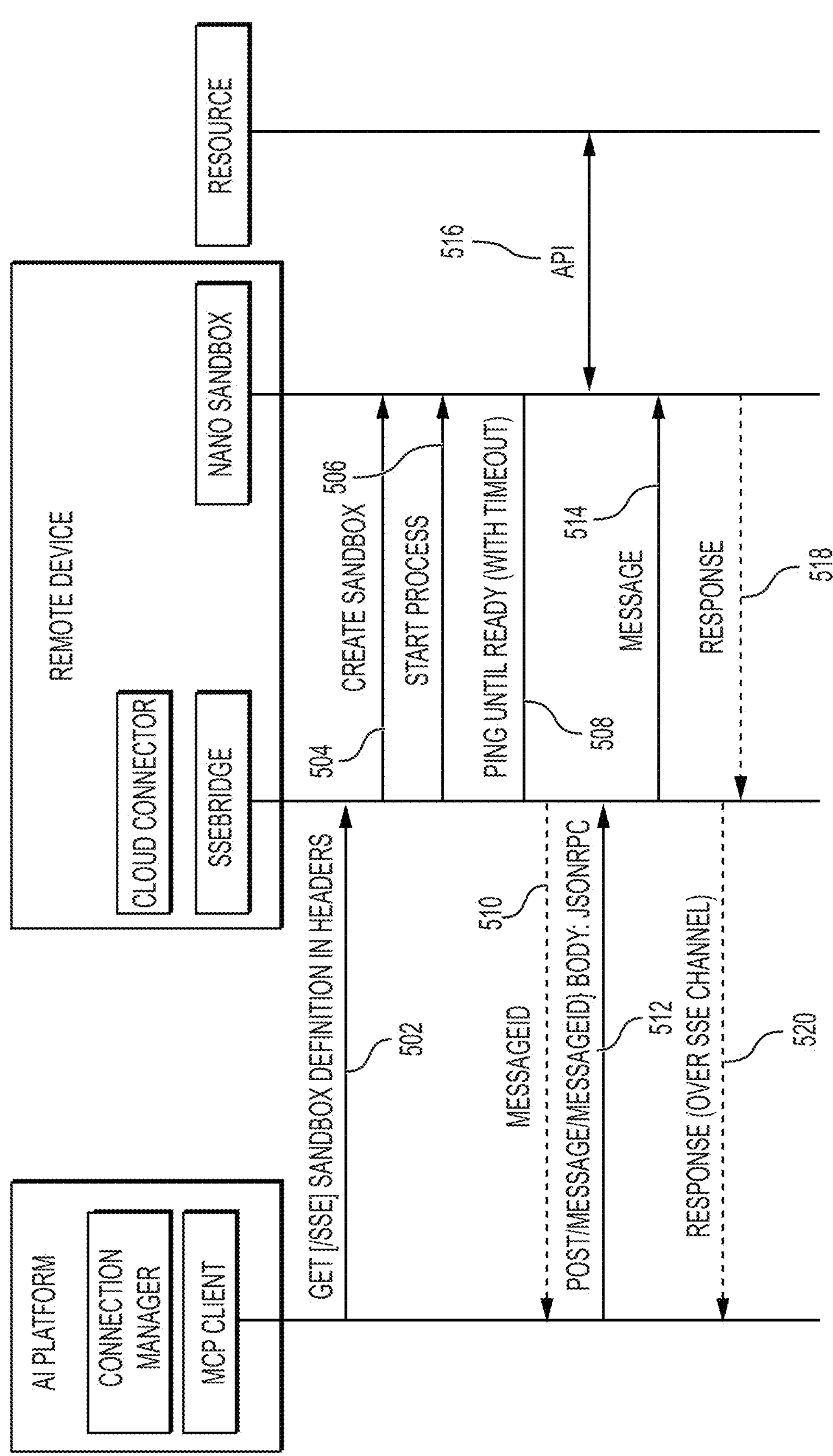
FIG. 5 is a sequence diagram of an example method for server-side AI agents to utilize remotely hosted MCP tools over secure cloud connections, including creating an server-side events ("SSE") connection and streaming communications with a nano sandboxed MCP process.

The execution of a tool command at the MCP server is separately described in FIG. 5.

At stage 234, the cloud connector transmits the first output back to the connection manager over the secure tunnel. The connection manager forwards the first output to the agent executor at the AI platform at stage 236.

At stage 238, the agent executor applies output guardrails to the first output. These can be the same or different set of guardrails applied in stage 218. The output guardrails can detect system prompt fragments that should not be released. The guardrails can also detect PII, confidential information, and the like. The guardrails may also perform schema validation, enforce token limits, or redact sensitive values. If the output is found to contain restricted content, the agent executor can substitute placeholders, truncate the response, or block the output entirely.

At stage 240, the sanitized first result is provided to a downstream agent object or back to the remote device for display, depending on the manifest-defined workflow. If additional agent objects must execute, the sanitized output becomes the input for the next stage of execution.

In this example, the output of the agent object execution of stage 240 is then forwarded to the connection server at stage 242 and transmitted through the secure tunnel at stage 244 as a second input. At stage 246, the second input can be used at the remote device as described in the manifest file. Examples include using the second input as a query to a SQL database, using the second input as a resource command to execute a tool, or other miscellaneous tasks. From there, a second output is sent back across the secure tunnel at stage 248 and forwarded to the agent executor and guardrails or other security rule evaluation at stage 250. The security rule evaluation of stage 252 then yields a result, which is passed back to the remote device or separate user device at stage 254. The result then invokes display or can itself be displayed at stage 256. The final result reflects all guardrail evaluations, manifest constraints, and sanitized outputs. The user interface may display the result to an end user, or it may be consumed by a client-side application.

Throughout FIG. 2, the system can also perform supporting functions: token rotation for the secure tunnel to ensure cryptographic freshness, centralized logging of inputs and outputs (with execution metadata), and policy enforcement based on the manifest. These supporting functions enable enterprises to achieve secure, auditable, and policy-compliant integration of AI agents with on-premises resources.

Figure 3:
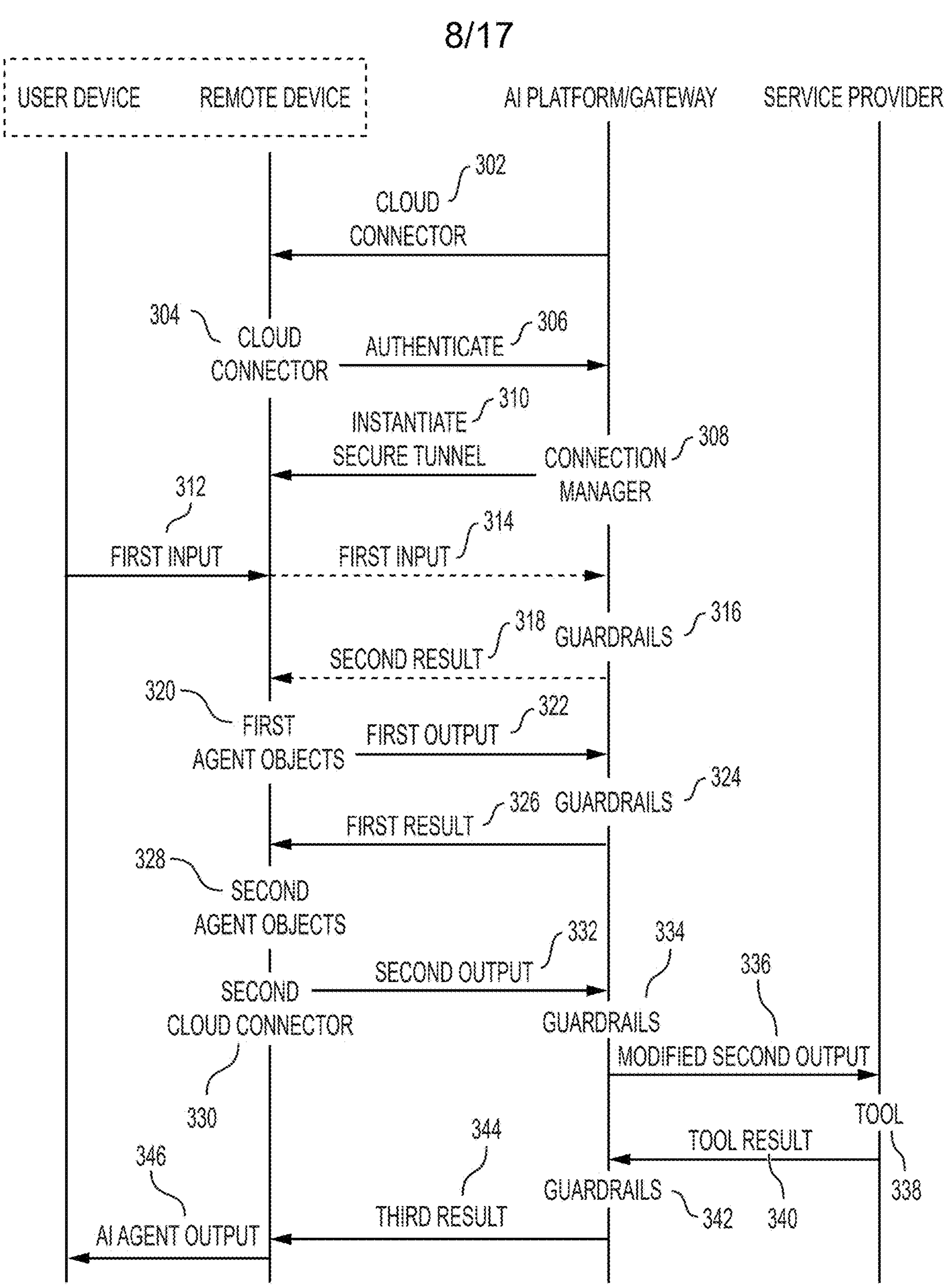
FIG. 3 is a sequence diagram of an example method for secure cloud connections that provide protection and oversight to remotely executed artificial intelligence AI agents.

FIG. 3 is a sequence diagram of an example method for secure cloud connections that provide protection and oversight to client-executed artificial intelligence AI agents. FIG. 3 represents an AI agent that executes at the remote device, but that utilizes a secure tunnel for guardrails and other functionality at the AI platform.

At stage 302, the AI platform transmits a cloud connector to the remote device. This can occur, for example, when a user creates a cloud connector using an UI of the AI platform, and then selects a download option.

At stage 304, a cloud connector executing at a remote device initiates an authentication request 306 to a connection manager at the AI platform or gateway server. The request may include a signed token issued during connector provisioning, a client certificate, and optional device posture evidence. The connection manager authenticates the request at stage 308 and, upon validation, opens a secure tunnel at stage 310 that encrypts bi-directional traffic with forward secrecy and periodic key rotation.

After the secure tunnel is established at stage 310, the secure tunnel remains open.

Later, at stage 312, the remote device receives a first input to an AI agent that executes at the remote device. The AI agent can execute according to a manifest file. If specified in the manifest file, the first input can be forwarded over the secure tunnel at stage 314 to the AI platform. At stage 316, the AI platform can apply security rules, such as guardrails, to the input. The agent executor can apply multiple layers of evaluation. Guardrail enforcement can be used to detect prompt injection attempts, confidential information, or PII. Schema validation can ensure the output matches expected formats and length constraints defined by the manifest. Policy checks can verify compliance with organizational rules, such as prohibiting export of financial records or system configuration data. Behavioral analysis flags anomalous remote device or user access patterns or unusually large payloads that may indicate misuse. If violations are detected, the agent executor can sanitize the output, block further execution, or inject warnings into the workflow.

As part of oversight, the system logs the received output, the evaluation results, and associated identifiers (e.g., user, remote device, agent object). Logs may be persisted in an immutable ledger or audit trail that supports forensic review and compliance reporting. Centralizing this recordkeeping ensures that remote agent executions are visible to enterprise administrators.

The security rules evaluation can output a second result that is sent back over the secure tunnel at stage 318.

The first input or second result is then used in executing a first agent object at stage 320. At stages 320 and 328, the agent objects that can be executed may include a wide range of components depending on the manifest specification. Agent objects can comprise AI models such as large language models, small domain-specific models, or fine-tuned task models that generate text, embeddings, or predictions. They may also include vector databases that store and retrieve embeddings for similarity search, enabling the agent to fetch relevant context documents or prior interactions. Datasets can be invoked as agent objects, including structured or streaming collections such as SQL tables, CSV files, or time-series feeds that the agent can query, filter, or aggregate. In some cases, code blocks may execute, representing snippets of Python, JavaScript, or shell commands that run in confined sandboxes to perform computation or data transformation. Tools can also be agent objects, encompassing external services invoked via APIs, MCP servers, or command-line interfaces, such as connectors to CRM platforms, productivity applications, or enterprise-specific APIs. Execution may further involve router objects that conditionally direct control flow to downstream objects based on guardrail results, user intent classification, or manifest policies. Memory objects can maintain conversational state or workflow context across multiple agent invocations, while prompt templates can provide predefined instructions to standardize model outputs and enforce policy compliance. Integrators may combine outputs from multiple other objects, such as reconciling results from models, databases, and tools. Certain agent objects may also function as identity or policy checkers, verifying user roles, device compliance, or data classification levels before permitting further execution. File I/O objects can be included, enabling controlled reading or writing of files in approved directories to ingest documents or export sanitized outputs. Finally, MCP servers operating at the remote device can themselves be agent objects, exposing tool specifications, prompts, or datasets to the AI agent through a standardized interface. Together, these different categories of agent objects provide a flexible but policy-governed framework for execution at both the remote device and the AI platform.

The first agent object outputs a first output at stage 322, which is sent over the first secure tunnel for evaluation by guardrails at stage 324. This output may contain raw inference results, embedding vectors, or structured database responses. Alongside the payload, contextual metadata is sent, including manifest identifiers and user-session tags, to allow precise attribution. The first result of the guardrails evaluation is sent back over the secure tunnel to the remote device at stage 326. The first result may contain a sanitized version of the output, a transformed response aligned with policy, or a control directive instructing the remote device to continue or halt execution of subsequent agent objects. This feedback loop allows the AI platform to retain centralized control and oversight, even as parts of the agent execute locally.

The first result can be used as an input or to determine the input to a second agent object at stage 328. Again, the second agent object can be identified in the manifest file.

In one example, a second cloud connector is utilized at stage 330 for sending a second output over the secure tunnel to the AI platform at stage 332. At stage 330, the second cloud connector can be deployed to provide redundancy, resiliency, and/or load balancing for secure access between the remote device and the AI platform. In one scenario, the second cloud connector operates in parallel with the first cloud connector, establishing an additional secure tunnel to the same connection server. This arrangement allows failover in the event that the first secure tunnel is interrupted or degraded, ensuring that AI agent execution can continue without disruption. In another scenario, the second cloud connector establishes a secure tunnel to a different connection server or even to a different geographic region of the AI platform, allowing traffic to be distributed across servers and reducing latency for workloads that require high throughput or low response time. The manifest may be configured to cause the agent executor to route certain agent object traffic through one connector and other agent object traffic through the second connector, providing separation of workloads or isolation of sensitive data flows.

A second cloud connector can also be used to segregate tenants or workloads by security level. For example, a connector operating under elevated compliance requirements can be restricted to a hardened connection server, while another connector handles general-purpose agent object execution. In some implementations, the second connector is provisioned with a different credential set, allowing rotation of tokens and session keys across connectors for improved key hygiene. The multiple cloud connectors can be packaged together during download, enabling a remote device to instantiate both simultaneously and maintain multiple tunnels with distinct configuration policies. The connection manager can also dynamically specify which connector to use for a given resource call, such as directing model inference through one secure tunnel while sending vector database queries through another, thereby optimizing both security and performance.

In one example, the second cloud connector can be configured for monitoring or observability purposes, transmitting only logs, telemetry, or guardrail results over its secure tunnel while the first connector handles operational traffic. This separation can reduce interference between monitoring and production workloads and provide an independent audit path. Collectively, these scenarios demonstrate that the second cloud connector at stage 330 can be more than just a backup. Instead, it can be a flexible component that enables multi-path connectivity, stronger security postures, and optimized resource allocation within the AI platform's architecture.

The second output can be evaluated by guardrails at stage 334, with a modified version of the second output (due to the evaluation) being supplied as an input to a tool at stage 336. Again, this would be specified by the manifest or by the second agent object, which might request information from the tool. The tool executes at a service provider at stage 338, returning a tool result at stage 340. That tool result 340 can again be evaluated with guardrails at stage 342 before the AI platform transmits a third result across one of the secure tunnels at stage 344. The remote device can use the third result in generating an AI agent output at stage 346.

These stages protect enterprise resources and provide oversight across distributed AI agent workflows. Interactions between remote device and AI platform components can be mediated by security rules and logged for accountability, ensuring that remotely executed AI agents operate within policy boundaries.

Figure 4:
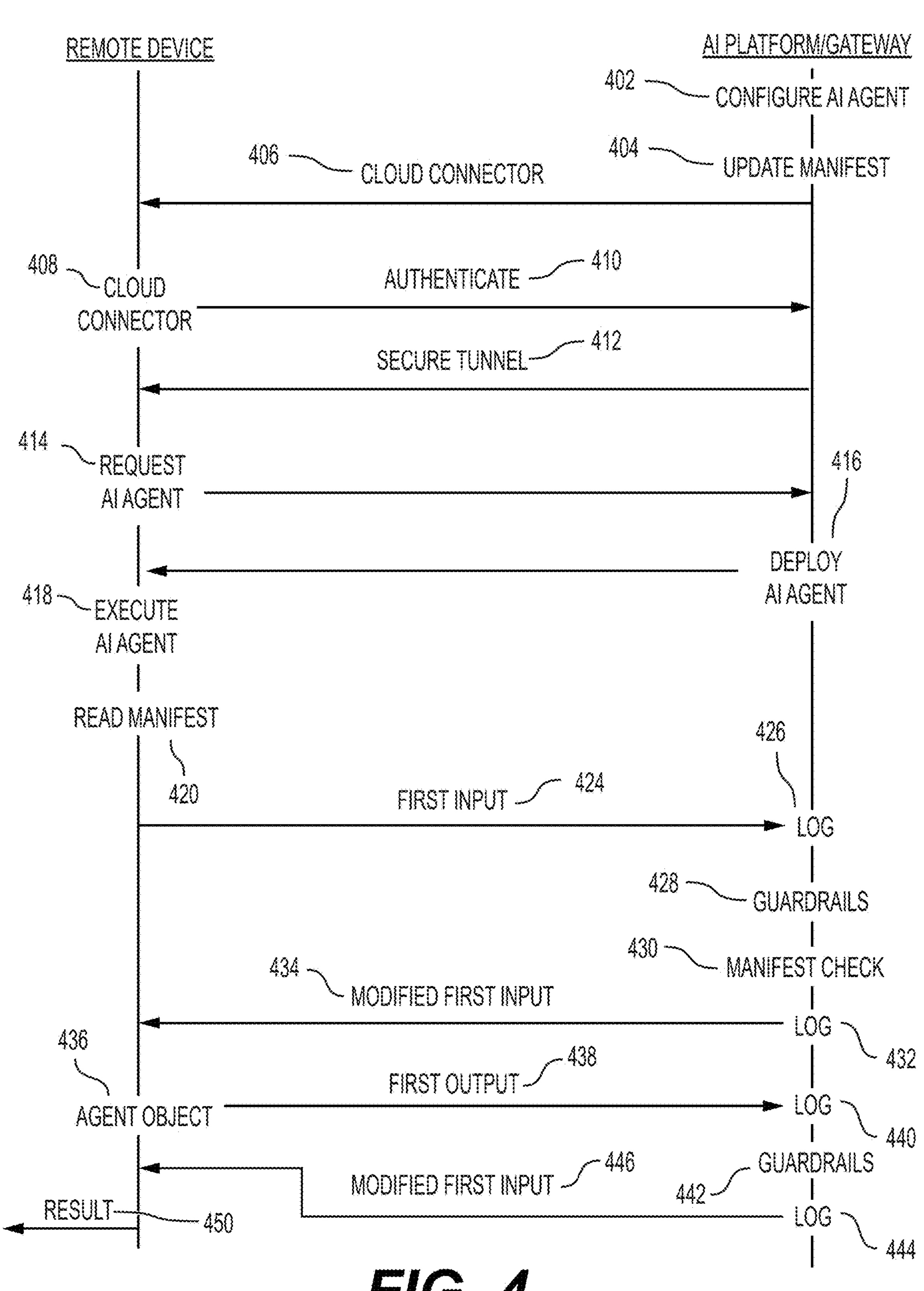
FIG. 4 is a sequence diagram of an example method for deploying artificial intelligence ("AI") agents over secure cloud connections and providing protection and oversight.

FIG. 4 is a sequence diagram of an example method for deploying AI agents over secure cloud connections and providing protection and oversight.

At stage 402, the system configures an AI agent. Configuration can occur through a UI provided by the AI platform, which enumerates available agent objects, such as AI models, datasets, vector databases, code blocks, and MCP tools. The configuration process may allow the user or administrator to specify execution policies, assign roles, and define guardrail profiles that will govern both the inputs and outputs of the AI agent. In one example, the configuration is expressed in a high-level declarative format, such as JSON or YAML, which is subsequently translated into a manifest file. Configuration can also involve integration with enterprise identity systems to ensure that the AI agent inherits role-based access controls. At a technical level, configuration can include selecting allowable transport protocols, specifying sandbox modes for code execution, and defining schema templates that outputs must satisfy. This stage enables precise tailoring of the AI agent's capabilities while constraining its scope to minimize security risks.

At stage 404, the AI platform updates the manifest file of the AI agent based on the configuration of stage 402. Updating the manifest can involve inserting or modifying references to specific agent objects, adding schema constraints, and embedding cryptographic checksums to attest to the authenticity of included components. The update may also introduce annotations that reflect guardrail requirements, such as flags that certain outputs must undergo confidential-information scanning or that certain prompts must be validated for injection attempts. In some cases, the updated manifest incorporates dynamic conditions, where the execution path depends on compliance status of the client device or real-time evaluation results from guardrails. Updating the manifest also ensures version control and provenance tracking; each updated manifest can be digitally signed by the AI platform to prevent tampering before transmission to a remote device.

In one example, the configuration at stage 402 includes a request to deploy the AI agent locally at the remote device. The UI can also provide options for the user to select local AI models and other agent objects that are available at the remote device. At stage 404, the manifest file can update to identify those local agent objects.

At stage 406, a cloud connector is transmitted to the remote device. This can be based on a user selecting in the UI to download the cloud connector.

At stage 408, the cloud connector executes at the remote device, sending an authentication request at stage 410 to the connection server of the AI platform. The authentication request may include signed tokens, device posture metadata, and manifest references.

At stage 412, a secure tunnel is opened between the cloud connector of the remote device and the connection manager of the AI platform. The secure tunnel may employ mutually authenticated TLS with key rotation, replay protection, and multiplexing of multiple logical streams for data, control, and logs.

At stage 414, the remote device requests execution or deployment of the AI agent. The request can be sent across the secure tunnel. The request may reference the manifest file updated at stage 404 and can include information about the local execution environment, such as available compute resources, operating system details, or sandbox capabilities. In one example, the AI platform queries the remote device over the secure tunnel to ensure that the various agent objects and other resources identified in the manifest file are available to remote device. The AI platform can likewise perform a security rule evaluation based on the posture of the remote device, such as the query responses, geographic location, and other contextual information.

At stage 416, the AI platform deploys the AI agent to the remote device. Deployment can involve transmitting the manifest file, an agent executor binary, and initialization parameters through the secure tunnel. The agent executor can launch in a restricted runtime environment at the remote device, such as a container or confined user space, ensuring that execution remains bounded.

At stage 418, the deployed AI agent is ready for execution. The agent executor initiates execution of the AI agent according to the manifest that is read at stage 420. Execution may involve invoking local agent objects, such as an on-premises AI model or dataset, and routing results back to the AI platform through the secure tunnel.

In this example, at stage 424, prior to executing an agent object, the first input of the agent executor is sent across the secure tunnel to the AI platform, where it is logged at stage 426. Again, this logging can be used to build a master log and provide central visibility even though the AI agents are executed other places.

At stage 428, guardrails are applied to the first input. Input guardrails may include lexical scanning for prompt injection payloads, filtering of personally identifiable information, and schema validation of structured requests. These guardrails may detect confidential information, system prompts, or other restricted content. Detection mechanisms can include embeddings-based similarity search against confidential corpora, pattern recognition for structured secrets such as API tokens, and rule-based checks for disallowed file paths or network addresses.

At stage 430, the manifest is checked to determine a next step. This can also be done based on the results of the guardrail evaluation at stage 428. The manifest check ensures that outputs conform to both structural requirements and security rules defined at configuration. For example, if the manifest specifies that outputs from a given agent object must be schema-validated and redacted for PII, the system verifies that those conditions were satisfied. If discrepancies are detected, the manifest check may trigger modification of the output, block its propagation, or halt execution of downstream agent objects. The manifest check may also update compliance counters or audit markers to record that a guardrail condition was invoked. By tightly coupling guardrail evaluation with manifest enforcement, the system guarantees that the execution of AI agents remains within enterprise policy boundaries.

In this example, the manifest file indicates that the sanitized first input should be logged and then sent back to the remote device for use with an agent object. At stage 432, the sanitized first output is logged, providing an immutable record of modifications applied by the guardrails.

At stage 434, the modified (e.g., sanitized) input is sent back over the secure tunnel to the remote device, where an agent executor utilizes the sanitized input in executing an agent object at stage 436. From here, the same process occurs. At stage 438, a first output is sent back over the secure tunnel, where it is logged at stage 440, evaluated against security rules at stage 442, with the sanitized first output being logged at stage 444 and sent back at stage 446. The agent executor continues executing agent objects in an order specified by the manifest. Subsequent inputs and outputs can follow the same process: execution of agent objects, application of guardrails, logging of results, and manifest checks to ensure compliance at each step.

Finally, at stage 450, the remote device returns a result to another user device or displays the result itself. The result represents the sanitized, policy-compliant output of the AI agent workflow, verified against both guardrail rules and manifest constraints.

FIG. 5 is a sequence diagram of an example method for server-side AI agents to utilize client-hosted MCP tools over secure cloud connections, including creating a server-side events ("SSE") connection and streaming communications with a nano sandboxed MCP process.

The sequence diagram illustrates a "standard mode" usage of the nano sandbox. The AI platform implements a persistent connection approach where nano sandboxes are created at the remote device and maintained for ongoing interactions, enabling multiple message exchanges over a single established session.

This approach provides long-lived connections using the SSE protocol. Implementing SSE inside the secure tunnel allows the channel to inherit the confidentiality, integrity, and replay protection already provided by the mutually authenticated TLS session established between the cloud connector and the connection manager, ensuring that streaming outputs from the MCP server cannot be intercepted or altered. The secure tunnel can multiplex multiple logical sub-channels, such as control traffic, API calls, logging streams, and the SSE event stream, over the same socket connection, which reduces the need for opening additional firewall ports and simplifies enterprise deployment. Because the SSE channel is bound to the same authenticated session as the tunnel itself, authentication and session binding are automatically enforced without requiring separate credentials. The arrangement also ensures that outputs transmitted over SSE can still be intercepted at the connection manager for guardrail evaluation before being delivered to the AI platform, maintaining consistent policy enforcement across all traffic types. One trade-off of implementing SSE within the secure tunnel is the need for multiplexing and framing mechanisms to distinguish event messages from other traffic types. In some cases, SSE may still be run outside the secure tunnel as a direct encrypted stream but placing it inside the secure tunnel provides stronger security guarantees and simpler lifecycle management of encryption keys.

Nano sandbox definitions can be provided through HTTP headers, defining the execution environment. Message IDs assigned to correlate requests with responses. This mode can be used for persistent MCP processes that handle multiple commands. The SSE bridge or another process performs manual cleanup when SSE connections close.

At stage 502, the MCP client of the AI platform initiates a GET request to the SSE endpoint at the remote device. The GET request is not a typical GET just for retrieval. Instead, the request initiates an SSE channel between the client and the SSE bridge. The request also carries a definition of the nano sandbox environment in the headers. This can include what kind of tool or model to run, resources needed, and the like. For nano sandbox creation, the HTTP header can serve as a primary mechanism for transmitting nano sandbox configuration parameters.

At stage 504, the SSE bridge creates the nano sandbox based on the extracted definition. An example definition is shown below:

```
{
  "Command": "npx",
  "Arguments": ["-A", "-y", "-q", "@tokenizin/mcp-npx-fetch"],
  "EnvironmentVariables": {
    "BRAVE_API_KEY": "api-key"
  }
}
```

The above is an example JSON object that defines how the nano sandbox should initialize and launch the STDIO MCP process (i.e., the MCP server inside the nano sandbox). The JSON object is passed as part of the headers (i.e., metadata) in a GET/SSE request to the SSE bridge, which uses the definition to start the correct nano sandboxed process. The JSON can be deserialized into a structured configuration object. Configuration can be validated for security and completeness. Then, parameters are translated into bubblewrap command-line arguments.

Commands are checked against allowed or blocked lists. Resource limits and security rules can be enforced.

"Command" "npx" tells the nano sandbox to run the Node.js package runner npx. The command npx is used to execute a Node package without installing it globally.

"Arguments": ["-A", "-y", "-q", "@tokenizin/mcp-npx-fetch"]

These are flags and parameters passed to npx. -y auto-confirms any prompts,-q sets the execution to quiet mode. "@tokenizin/mcp-npx-fetch" indicates the actual package to run in the nano sandbox as the MCP process. It can indicate an MCP-compliant tool provided by the @tokenizin npm scope. It will be executed by npx and is expected to behave like a JSON-RPC STDIO server.

Depending on implementation, the system may support additional headers. For example, an authentication header can include bearer tokens or API keys. A resource limits header can define memory, CPU, or time constraints. A network policy header can define network access, if any. File system mounts can be defined in the header. This can dictate which file systems are mounted within the nano sandbox for use with the MCP process. Session parameters can indicate timeout settings and keep-alive options. Debugging flags can specify verbose output or additional logging.

In the header value example above, environmental values are defined: "EnvironmentVariables": {"BRAVE_API_KEY": "api-key"}.

These environment variables can be injected into the nano sandbox process environment. For example, the MCP process can see BRAVE_API_KEY-api-key in its environment.

This can be used internally by @tokenizin/mcp-npx-fetch to authenticate or query an external API.

Using this definition, the SSE bridge can create the nano sandbox at 504. The nano sandbox can be created using bubblewrap (bwrap), with communication handled with STDIN and STDOUT. The environmental parameters can be translated into bubblewrap command-line arguments. The bubblewrap command is constructed with appropriate isolation flags. This can include restricting file system access within the nano sandbox to specified directories that are copied into the nano sandbox. Network access can be configured according to security requirements. System call filtering can be applied to limit potential attack surfaces.

Next, at stage 506, the target MCP process (in this example, the npx command) is launched within the bubblewrap container. STDIO streams are connected to the isolated process. STDIN pipe is created for sending commands to the process, and an STDOUT pipe is established for receiving responses. These pipes form the primary communication channel for JSON-RPC messages.

At stage 508, the SSE bridge pings the MCP process until receiving a return ping. The SSE bridge pings the MCP process (via STDIO or health checks) to ensure the MCP process is ready before accepting messages. When the process responds, this indicates that initialization is complete.

If the MCP process does not come up in time, a timeout can occur. In that instance, the SSE bridge can send back a failure via the SSE channel.

Once the nano sandbox and MCP process are confirmed ready, at stage 510 the SSE bridge can return a session ID, in this case a message ID, to the MCP client of the AI platform (e.g., gateway server). Again, this can be sent over the secure tunnel implemented by the cloud connector, or a separate SSE channel. With the session ID, the MCP client can send JSON-RPC payloads to the MCP process at stage 512.

At stage 512 a POST includes the actual command in JSON-RPC format. The POST is the vehicle that delivers the JSON-RPC command:

The {MessageId} uniquely identifies the message (like a request ID) and allows the SSE bridge of the remote device to know where to send the resource command.

The POST does not return the full response directly. Instead, the system is non-blocking, such that the response will come asynchronously through the open SSE stream to the MCP client established based on the GET at stage 502 or before.

At stage 514, the SSE bridge forwards the received JSON-RPC message to the correct nano sandbox instance. The correct instance can be identified by the session ID (e.g., message ID). Writing the JSON-RPC message to STDIN causes the nano sandbox to forward the command to the running MCP process.

The MCP process executes the command. This execution can include initiating network communication from within the nano sandbox to one or more external resources at stage 516. For example, the MCP server may make an outbound API call to a service provider to access a cloud-hosted dataset, query a remote backend system, or invoke a third-party or provider-operated AI model hosted outside the sandbox environment. These interactions can involve synchronous or asynchronous data exchange, including request/response payloads, streamed outputs, or event-driven callbacks. The resource may return results or computed outputs to the MCP server, which remains executing within the security boundaries of the nano sandbox.

Although the MCP server can send and receive data to and from these external systems, the nano sandbox restricts access to the underlying file system and runtime environment. Specifically, the MCP server is prevented from accessing user files, system libraries, or device-level resources unless such assets have been explicitly provisioned or mounted into the sandbox by the orchestrator. This isolation ensures that even if the external resource attempts to exploit the communication channel—for example, by injecting malicious payloads or redirecting outputs to sensitive file paths—the sandbox environment enforces strict containment. As a result, unauthorized file reads, writes, or deletions outside the scope of the sandbox's allowed directories or permissions are blocked by design.

In some cases, the nano sandbox may enforce fine-grained network controls as well, such as domain-based allowlists or egress rate limits, to ensure that the MCP server cannot exfiltrate data to unknown endpoints or misuse access to privileged APIs. This layered architecture allows the MCP server to leverage dynamic, external resources while still maintaining strong guarantees around process isolation, data integrity, and runtime security.

At stage 518, the MCP process writes the output to STDOUT. The output is then read by or sent back to the SSE bridge. Additionally, the SSE bridge monitors STDERR for error messages and exceptions.

At stage 520, the SSE bridge of the remote device sends the response to the MCP client of the AI platform through the SSE channel (which can be within the secure tunnel). This can allow for real-time delivery even for long-running tasks, which can be ideal for AI inference, tool use, and the like.

When the SSE connection ends, the container and MCP process are terminated. This process isolation prevents access to the host system and enforces limitations on CPU, memory, and file system usage. Input validation protects against malformed commands.

Alternatively, the client can execute a one-off MCP tool, such as in response to a single resource command. This need not open an SSE connection and can instead utilize an ephemeral nano sandbox and MCP process for a single resource command. The connection server can send a JSON-RPC command to the client, which is received by cloud connector and forward to the SSE bridge of the client environment. The command can be sent over a regular HTTP or SSE connection.

An example JSON-RPC command from the connection server is shown below:

```
{
  "jsonrpc": "2.0",
  "id": "42",
  "method": "generate_summary",
  "params": {
    "text": "Artificial Intelligence has made significant strides in recent
years, particularly in the domain of natural language processing..."
              }
        }
```

This command follows the JSON-RPC 2.0 specification, asks to invoke the generate_summary method, passes a text string as a parameter, and expects a result back under session ID: 42.

Then, the SSE bridge forwards the command to the nano sandbox. The nano sandbox sends the commands to the MCP process by writing to STDIN. The MCP process executes the command. This can include communicating over a network outside of the nano sandbox to a resource. For example, the MCP server executing at the client can make an API call to a dataset, a backend system, or a provider's remote AI model. The resource can return a result to the MCP server within the nano sandbox. But the nano sandbox can prevent the MCP server from accessing user or system files other than the ones specifically provisioned within the nano sandbox. This security feature ensures that if there is back-and-forth between the resource and the MCP server, the resource cannot access unauthorized files or write or delete within unauthorized system folders.

An output is written to STDOUT. Based on the example command, an example output could be:

```
{
  "jsonrpc": "2.0",
  "id": "42",
  "result": "AI has recently advanced, especially in natural language processing."
}
```

The SSE bridge can read this output from the STDOUT pipe. Then, after checking the output against security rules, the SSE bridge can return the output as a response to the MCP client.

In one example, the lifecycle of the nano sandbox can be driven by a single HTTP POST that contains the nano sandbox definition, includes the JSON-RPC command, waits for the MCP output, then destroys the nano sandbox. Such an example can be a stateless, request-response model, which corresponds to a one-to-one mode. This mode is particularly suitable for short-lived, stateless operations where process isolation is important and the overhead of creating new containers is acceptable.

Figure 6:
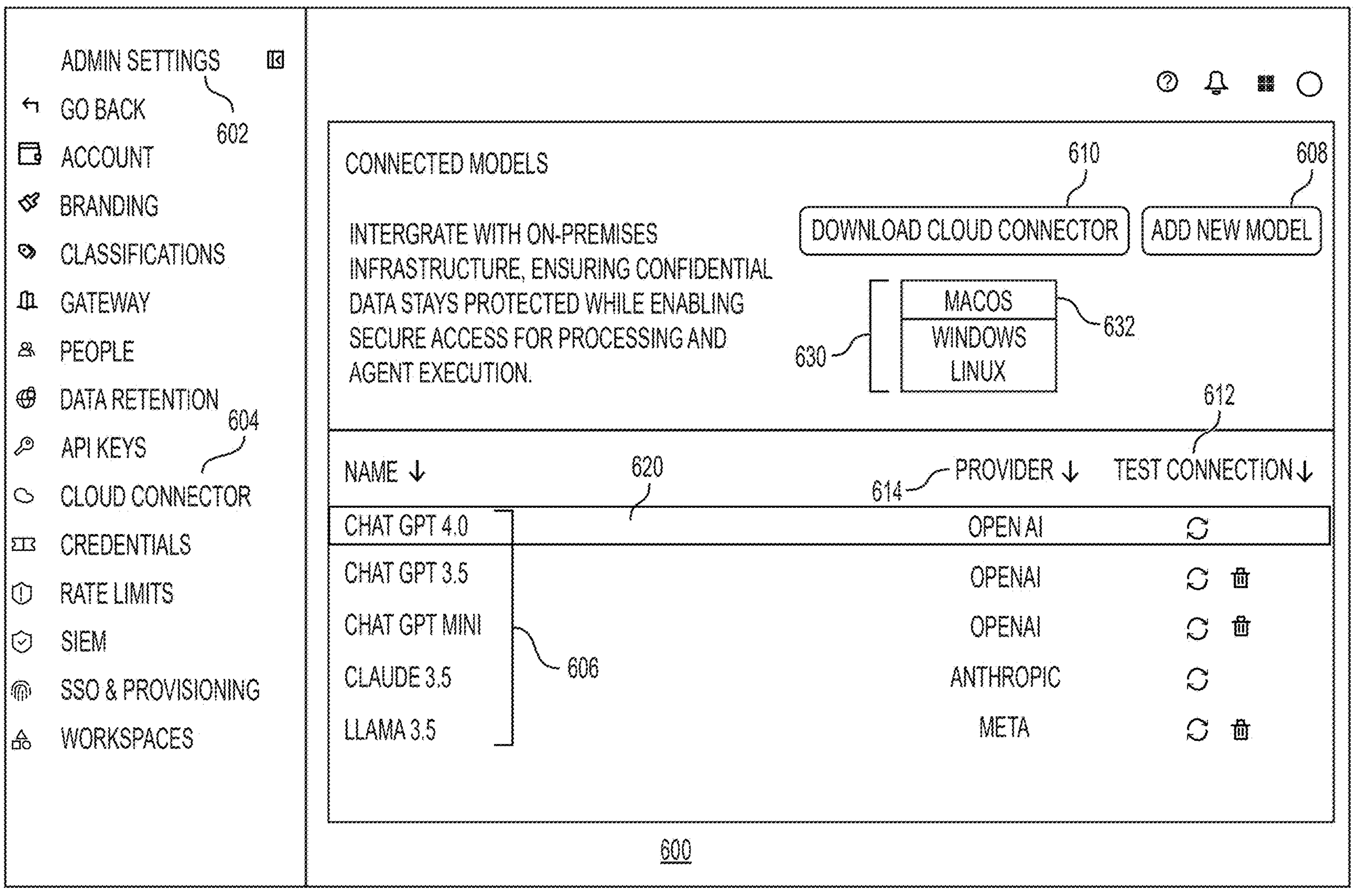
FIG. 6 is an illustration of an example user interface ("UI") for connecting on-premises AI models to a connection server of the AI platform through use of a cloud connector.

FIG. 6 is an illustration of an example UI for connecting on-premises AI models to a connection server of the AI platform through use of a cloud connector. The UI can be accessed remotely, such as by a user or enterprise customer attempting to set up their remote device for operation with AI agent functionality provided by the AI platform (e.g., gateway server). Screen 600 provides cloud connector settings based on a user selection of administrative settings 602, and then the sub-menu item for cloud connector 604.

Screen 600 shows a list 606 of managed cloud connector objects. Cloud connectors that are installed based on these objects can be used with various AI models. For example, an installed cloud connector can allow for AI agent access to AI models and other agent objects (e.g., vector databased) at the remote device or on a network address accessible by the remote device. The list 606 includes columns to indicate the model provider 614, as well as a column 612 of buttons for testing the connection of each cloud connector. Testing the connection can, from the remote device, execute the cloud connector to verify it connects with a connection server. Additionally, the UI can show when connections have failed, and allow the user to remove cloud connectors from activation at the remote device.

Cloud connectors can operate and be managed in an environment at the remote device that is provided by the AI platform as part of the download.

A button 608 allows users to add new models for use with cloud connectors. Additionally, selection of button 610 causes download of selected cloud connectors to the remote device. In one example, the button 608 creates a new managed cloud connector object within the list 606, with the new managed cloud connector object configured to operate with the chosen model provider.

In this example, a first managed cloud connector object 620 is selected for download. Clicking the download button 610 can cause the display of a dropdown menu 630 with platform options, such as MacOS, WINDOWS, and LINUX. This can allow the user to select which OS the corresponding cloud connector will operate with on the remote device. In this example, the platform selection 632 is for MacOS.

Next, a cloud connector installer can download to the remote device. This can be a file or a command that directs the remote device to a file. The installer then executes, installing the cloud connector for use at the remote device.

Figure 7:
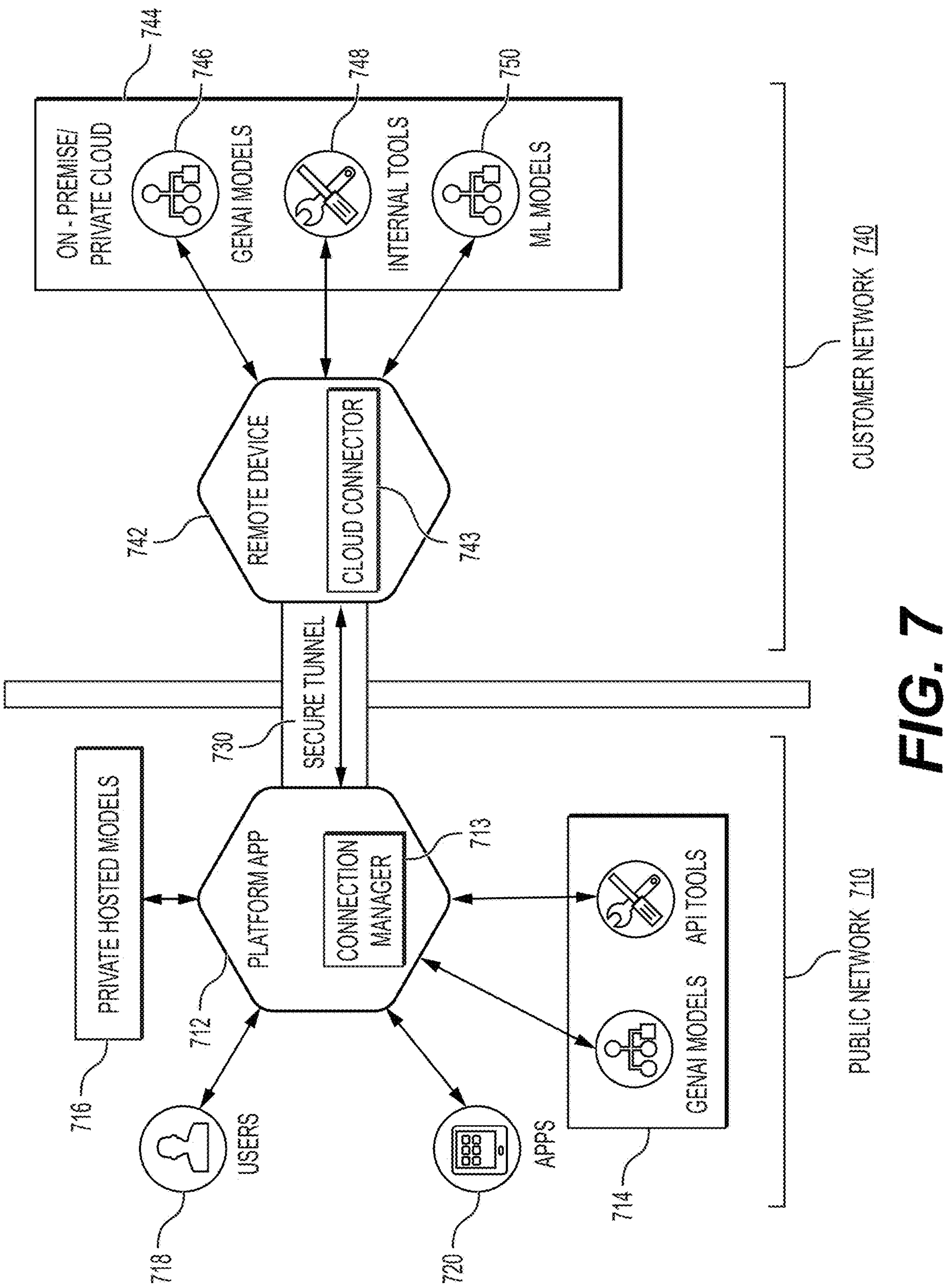
FIG. 7 is an illustration of example system components for securely connecting a remote device network to an AI platform.

FIG. 7 is an illustration of example system components for securely connecting a client network to an AI platform. In this example, a remote device 742 interacts with an AI platform application (e.g., at a gateway server or other server) through a secure tunnel 730. The remote device 742 may execute a cloud connector 743, which establishes a mutually authenticated and encrypted session with a cloud manager at the AI platform 712. The secure tunnel 730 can multiplex data, control, logging, and telemetry streams over a single socket, providing confidentiality, integrity, and replay protection while reducing firewall configuration complexity.

The secure tunnel 730 provides connectivity over the public network 710, such as the internet, into a private customer network 740. The private customer network 740 can be a distributed set of servers deployed and run by an enterprise. Alternatively, the private customer network 740 can be a local area network to which the remote device 742, such as a laptop, is connected.

Within the AI platform 712, an application with a UI can expose multiple types of resources for use as agent objects. These can include private hosted models 716 of the AI platform and cloud-hosted models 714 by service providers, such as generative AI models and API-accessed tools. API tools can represent third-party connectors or SaaS applications that can be invoked by the agent executor as part of a workflow. Generative AI models can include large language models or multimodal models capable of producing text, image, audio, or structured outputs.

The AI platform 712 can also execute a connection manager 713, which performs a handshake with cloud connector 743 when the correct key is supplied by the cloud connector 743. This allows for authentication and a secure tunnel, such as a virtual private network, can be opened between the two.

Various applications 720 can connect to the AI platform to execute AI agents there. These applications can run on user devices, which can be any processor enabled device, allowing users 718 to execute the platform-based AI agents.

The architecture also supports hybrid deployment. The secure tunnel 730 can allow the AI platform to maintain a secure connection to remote devices on customer networks 740. The remote device 742 can run an execution environment provided by the AI platform and can access on-premise agent objects 744. These can include additional generative AI models 746, internal tools 748, and machine learning models 750. Machine learning models 750 can include classification models, embedding models, or fine-tuned task-specific models. Internal tools 748 may comprise enterprise analytics, monitoring, or policy enforcement utilities accessible only within the platform boundary.

On-premise or private cloud infrastructure can host additional agent objects 744, such as generative models or sensitive datasets. These resources may be exposed through the secure tunnel while remaining under enterprise control, ensuring data residency and regulatory compliance. Private-hosted models may run in containerized or virtualized environments and may require attestation or posture validation before they are authorized for execution. Public network applications may also be incorporated, where the AI agent invokes SaaS APIs or retrieves publicly available datasets through guardrail-mediated requests.

Users 718 on the customer network 740 can also interact with the AI platform by submitting prompts, invoking tools, or initiating workflows through applications on the remote device 742. Requests and responses traverse the secure tunnel 730, ensuring that guardrails and manifest constraints are applied consistently to both inputs and outputs. The architecture of FIG. 7 thus enables the AI agent to combine platform-hosted resources, private infrastructure, and public services into a single policy-compliant workflow. By anchoring all interactions in the secure tunnel and manifest-driven execution, the system provides enterprises with oversight, protection, and auditability while enabling broad integration of AI capabilities.

Figure 8:
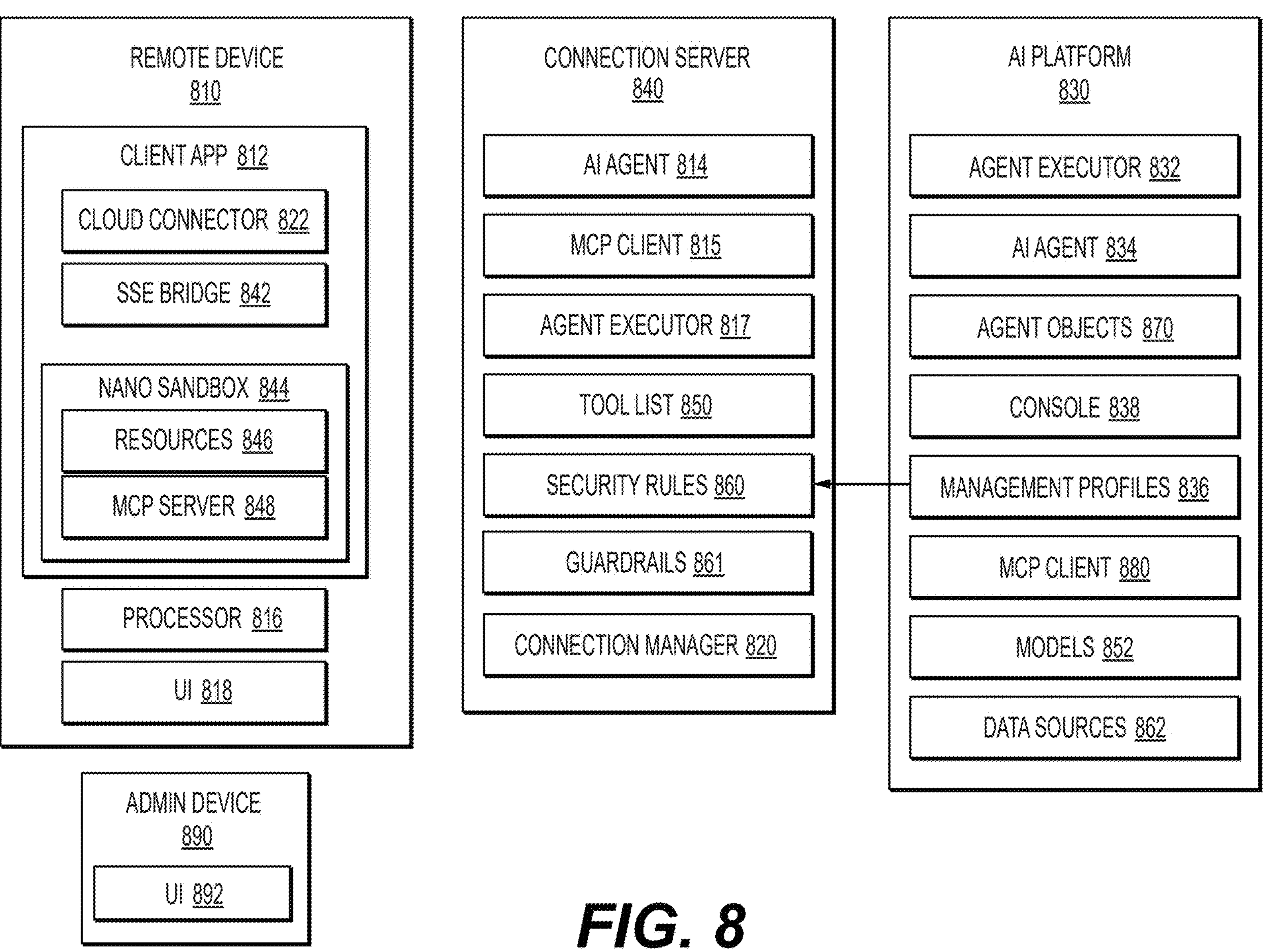
FIG. 8 is an example illustration of system components for secure MCP server access for AI Agents.

FIG. 8 is an example illustration of system components for secure MCP server access for AI Agents. In this example, a remote device 810, such as a user device, executes a client application 812 that can be provisioned by an AI platform 830. The client application 812 can act as an execution environment for executing some or all of an AI agent 834. The remote device 810 can be any device with a processor 816 and can include a screen for displaying a UI 818. The processor 816 can execute the client application 812. The client application 812 can execute an AI agent 814. The AI agent 814 can reference an address, such as an URL, that corresponds to an agent executor 817 or 832, which can be one or more processes that execute on one or more physical servers. For example, the agent executor 832 can operate on a proxy or gateway server, such as connection server 840. The agent executor 832 can also operate in the cloud, or as part of an AI platform 830. The AI platform 830 can operate on one or more servers and provide a UI as part of a console 838 for allowing administrators to design the AI agent 834 (among others) and set management rules for those.

The console 838 also provides a UI 892 that allows the administrator to create and modify AI agents 834 by accessing a consol 838. The UI 892 can allow the administrator to assign AI models 852, data sources 862, and other agent objects 870 to the AI agent 834. The UI also visualizes MCP-related changes so the administrator can allow or block various tools in a tool list 850. An administrator can connect to a console 838 using an administrator device 890, in an example. The connection can be remote, such as over the internet, and the administrator device 890 can be any processor-enabled device, such as a laptop. The management rules can be stored in management profiles 836, which the agent executor 832 (including the rules engine) can use for executing the AI agent 834.

Using the UI 818, the remote device 810 can connect with the AI platform 830 and download a cloud connector 822. The cloud connector 822 can operate as part of the client application 812. In one example, the cloud connector 822 executes and makes a request to a connection server 840. The connection server 840 includes a connection manager 820 that authenticates the incoming request and opens a secure tunnel with the remote device 810. This can include applying security rules 860 derived from a management profile 836, prior to opening the secure tunnel. The secure tunnel remains open and maintained by the cloud connector 822 and connection manager 820.

The remote device can execute an AI agent 814, 834 at the connection server 840 or AI platform 830. An agent executor 832, 817 can perform stages as defined in a manifest file. The agent executor 832 can rely on a rules engine for enforcing security rules on inputs or outputs from the client application 812 prior to those inputs being transmitted to a particular AI model or other agent objects 870. The rules engine can also dictate which data sources 862, such as vector databases, are available to the user. For example, a vector database can include access restrictions, and the user may need adequate permissions to gain access. The rules engine can comprise one or more processes that are executed on one or more physical servers.

The AI agent 834 can utilize an MCP client 815 or 880 in executing various tools, prompts, or datasets that can exist on an MCP server 848. The MCP client 815 can be one or more processes that execute and send and receive data with an MCP server. This can be facilitated with a secure intermediary, such as connection server 840 and SSE bridge 842.

Connection server 840 can be one or more servers and can be part of the AI platform 830 or separate. Connection server 840 can connect across the secure tunnel to the remote device, where an SSE bridge 842 can execute. The SSE bridge 842 listens for requests and commands from MCP clients 815, 880. As has been described, the AI platform 830 can apply security rules 860 to inputs or outputs of any stage of the AI agent 814, 834. For secure inputs, the SSE bridge 842 can create a nano sandbox 844 as defined in the header of an MCP client's request from the AI platform 830. The nano sandbox environment can be provisioned with various resources 846 needed for the MCP process. The SSE bridge 842 can launch the MCP process, such as an MCP server 848, within the nano sandbox 844.

The connection server 840 can request a tool list 850 from MCP servers at the remote device 810. These lists 850 can be stored and compared to detect differences and changes. Those can then be viewed in a console 838, which can be accessed on a UI 892 on an administrator device 890.

To execute the tools securely, the agent executor 832 can make calls to an MCP client 880, which can operate as one or more processes. An API can define different functions available to the MCP client 880. The MCP client 880 can execute at the AI platform 830 or at some other server, such connection server 840. The MCP client 880 can interact with the SSE bridge 842 to run MCP processes remotely at the remote device 810. The SSE bridge 842 can create simultaneous nano sandboxes 844. Each nano sandbox isolates the execution of an MCP process, such as an MCP server 848. Nano sandboxes 844 can also be created for customer scripts and other agent objects 870 in one example, such that the scripts cannot access information in other nano sandboxes or at the AI platform 830 or connection server 840 generally.

The MCP client 880 can dynamically create MCP environments by defining nano sandbox environments in the header of requests sent to the SSE bridge 842. This can ensure that the MCP process has the needed resources but cannot overreach outside the nano sandbox for system resources and the like.

The security rules, such as guardrails 861, can be applied differently to different users, who are tracked via user management profiles 836, including security rules 860, that are stored by a management server, gateway, and/or the AI platform. The management server can be part of AI platform 830 or separate. The management server(s) can execute the AI management service on one or more processors. The management profiles 836 can track information about users, groups, and tenants, and can include AI management profiles and AI user management profiles. The tenants can be customers or customers of customers. The groups can be divisions within those tenants, such as a developer group or an executive group. Various management rules, including security control markers, can be associated with the different management profiles 836. For example, the management rules discussed above can be stored in management profiles 836, which are assigned to particular users, groups, and tenants.

Figure 9:
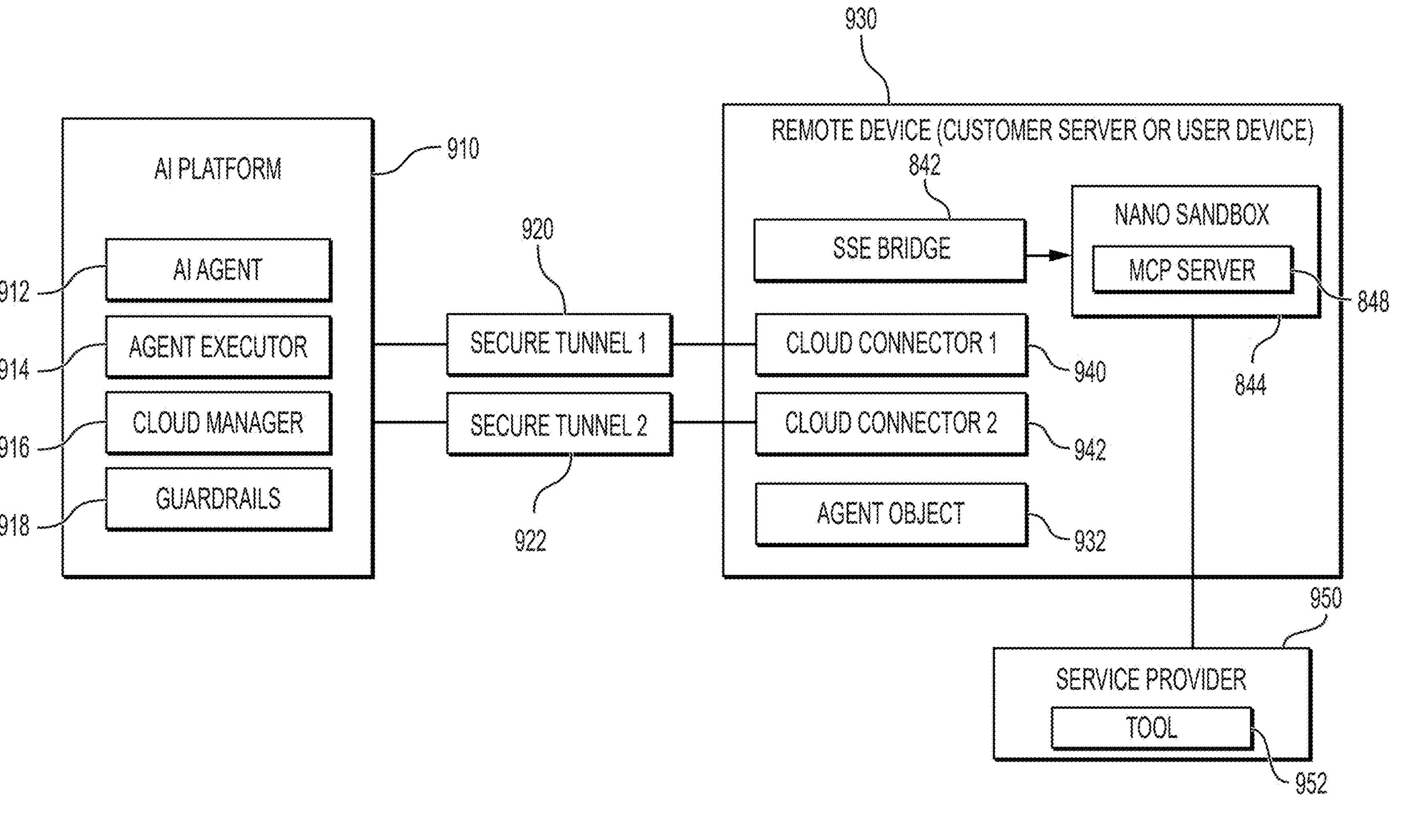
FIG. 9 is an illustration of example system components for securely connecting an AI platform to a remote device.

FIG. 9 is an illustration of example system components for securely connecting an AI platform to a client.

An AI platform 910 is one or more servers that provisions, executes, and governs artificial intelligence agents across both cloud-hosted and client-hosted resources. The AI platform 910 can include a connection manager 916 that establishes secure, mutually authenticated secure tunnels 920, 922 to remote devices 930 over cloud connectors 940, 942. These secure tunnels 920, 922 provide encrypted transport for agent inputs, outputs, logging, and telemetry, ensuring confidentiality and integrity of all communications. An agent executor 914 executes at the AI platform 910. The agent executor 914 reads manifest files, which define the agent objects 932 to be invoked, their execution order, and the security rules including guardrails 918 applied to each step. The agent executor 914 can call platform-hosted machine learning models, vector databases, internal tools, or external APIs, while also brokering access to client-side MCP servers 848 through server-sent event bridges and sandboxed environments, such as a nano sandbox 844.

Guardrails 918 enforce policy across inputs and outputs, detecting threats such as prompt injection, leakage of confidential information, personally identifiable information, malicious code, blacklisted tools and resource commands, and the like. Administrative functions, often accessed through a console, allow users to configure management profiles that specify restricted actions, triggers, and remedial measures, which are automatically applied during execution. The AI platform enables enterprises to maintain compliance, accountability, and operational resilience for an entire AI agent ecosystem across devices.

A nano sandbox 844 at the remote device 930 provides an isolated execution environment that runs an MCP server 848. The nano sandbox 844 is instantiated based on a definition received from the AI platform 910 or extracted from the manifest file. The nano sandbox 844 is configured with strict boundaries on system resources, filesystem access, and network permissions, based on a request from the agent executor 914 (acting as an MCP client) to the SSE bridge 842. Within the nano sandbox 844, the MCP server 848 initializes and advertises a set of tools or resource profiles that can be invoked by the AI agent 912. When the AI platform 910, through a connection manager 916 and SSE bridge 842, transmits a resource command over the secure tunnel, the resource command is routed to the MCP server 848 inside the nano sandbox 844. This routing can be based on a session identifier included with the resource command. The MCP server (or AI platform) validates the resource command against its resource profile and, if permitted, executes the corresponding tool 952.

In some cases, the tool 952 execution requires access to an external service provider 950. The MCP server 848, operating in the nano sandbox 844, establishes a controlled outbound connection to the service provider's 950 API endpoint. This connection may be proxied or policy-gated by the nano sandbox 844 so that only approved domains and protocols are accessible. The service provider 950 executes the requested function, such as retrieving enterprise data, performing an analytic computation, or invoking a SaaS application, and returns the result to the MCP server 848. The MCP server 848 passes the result back through the nano sandbox 844 boundary (such as on an STDOUT pipe). Guardrails 918 can redact or transform sensitive content and then utilize the sanitized output for further AI agent 912 operations. In this way, the nano sandbox 844 ensures that client-hosted MCP servers 848 can interact with external service providers while maintaining strict isolation, security policy enforcement, and centralized oversight.

Figure 10:
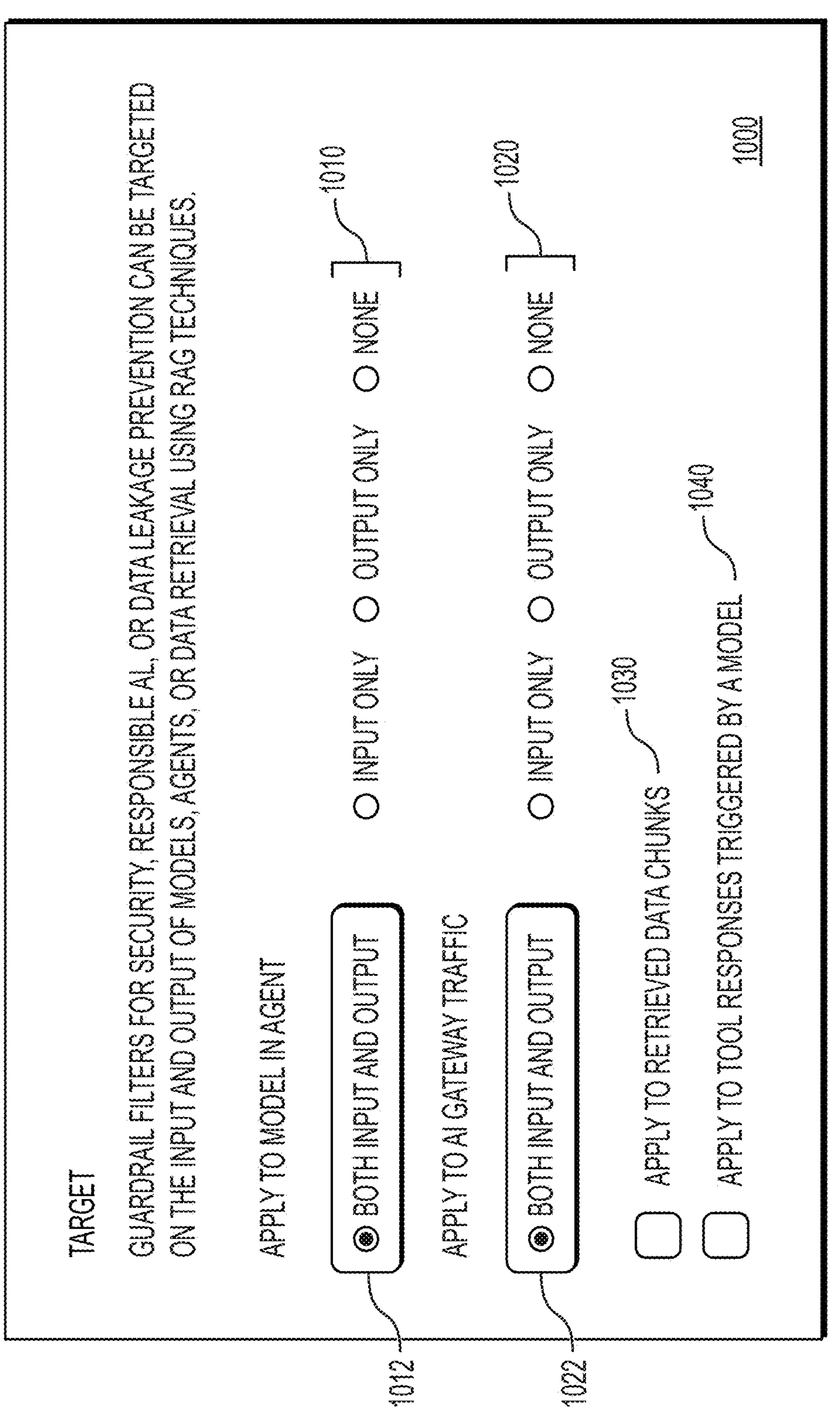
FIG. 10 is an illustration of a UI for specifying when security rules, such as guardrails, are utilized during execution of an AI agent.

FIG. 10 is an illustration of a UI for specifying when security rules, such as guardrails, are utilized during execution of an AI agent. Screen 1000 presents options that allow an administrator to select which inputs and outputs of an AI agent and specific agent objects are sent to guardrails for evaluation and potential modification.

A first set of options 1010 can pertain to a specific agent object type. In this example, options 1010 allow for specifying which inputs and outputs to an AI model used by an AI agent should be evaluated by guardrails. The options 1010 include a button 1012 for evaluating both inputs and outputs of the AI model with the guardrails, which is shown as selected in this example. Other options include input only, output only, and none.

Likewise, options 1020 relate to what overall gateway traffic should be evaluated with guardrails. Gateway traffic can include incoming and outgoing traffic, such as from and to remote devices or to and from various AI providers. In this example, button 1022 is selected to cause all input and output traffic from the AI platform (e.g., gateway) to be evaluated. For example, if an AI service is called for tool or AI model usage, the outgoing resource command will first be evaluated with guardrails, as will the result received from the AI service.

Option 1030 allows for applying guardrails to retrieved data chunks. In that case, data chunks that are relevant in a vector database search are first evaluated with guardrails before the chunk is utilized by the AI agent for other purposes or sent to the remote device.

Option 1040 allows for evaluating all tool responses triggered by an AI model. For example, an AI model can make requests to various tools, and those responses can be evaluated with the guardrails prior to further use by the AI model. This can eliminate risks of prompt injection and the like.

The implementation of these settings can occur in various ways. In one example, after the administrator applies these settings, the manifest file of the AI agent can be updated to include calls to the guardrails at the input and output locations specified by the selections. Alternatively, a management profile can indicate the selections. The agent executor at the AI platform and/or remote device can read the management profile to determine when to send an input or output for guardrail evaluation prior to use with the next agent object.

Various types of guardrails are now outlined. In some examples, the UI can allow an administrator to select between the types of guardrails that are applied. A URL sanitization guardrail can prevent open redirect exploitation and data exfiltration by detecting and removing URLs across inputs and outputs. It can employ pattern matching, policy validation, and threat intelligence to remove or replace URLs. Input preprocessing blocks malicious URLs before reaching models, and output filtering prevents delivery to end users. Configurable policies may universally remove, whitelist, or apply contextual rules. Logging and audit trails record all actions, with fallback sanitization when domain reputation is uncertain.

An HTML sanitization guardrail can protect generated code from XSS and clickjacking by parsing and filtering HTML. Whitelist-based policies preserve safe elements while removing scripts, event handlers, and iframes. Context-aware sanitization applies stricter rules for user-facing content and more permissive rules for documentation. Logging, validation, and CSP integration ensure compliance with security standards.

A link neutralization guardrail can disable clickable links across HTML, Markdown, and text outputs to mitigate phishing and exploits. It can use syntax tree parsing and pattern matching to detect inline, reference, and image links, replacing them with safe text while preserving readability and accessibility. Plaintext URL detection handles multiple schemes, domains, and encodings, with output verification ensuring no links remain clickable.

An alignment guardrail can detect semantic misalignment between user goals and agent actions using a dedicated language model operating in parallel with execution. It can analyze conversation goals and truncated execution traces, applying semantic similarity, goal drift detection, and sequence analysis. Summarization and caching optimize efficiency. Misalignments may trigger automated correction, human oversight, or execution pauses.

An authorization guardrail can intercept tool execution requests through middleware checkpoints and require explicit approval. Authorization prompts present tool metadata, payloads, and risk scores. Consent may be single-user, multi-factor, or multi-party depending on sensitivity, with cryptographic records and immutable audit logs ensuring compliance.

A system prompt hardening guardrail can prevent external content from being misinterpreted as instructions. It can use structured templates, role-based hierarchies, delimiters, and security directives. Techniques include instruction inoculation, context isolation, and validation checks. Continuous monitoring and adversarial testing detect and report injection attempts.

A prompt injection detection guardrail can identify malicious inputs intended to subvert model behavior. It can combine ML classifiers, rules, and heuristics to detect direct and indirect injection attempts. Real-time risk scoring enables blocking, alerts, or escalation. Detection models can update from threat intelligence and log all events for compliance.

A jailbreak detection guardrail can detect attempts to bypass restrictions through roleplay, social engineering, or incremental manipulation. Behavioral and contextual analysis evaluate conversation trajectories to identify sophisticated jailbreaks. Known techniques can be stored in continuously updated databases. Escalation workflows may increase monitoring, require confirmation, or terminate sessions.

A keyword detection guardrail can filter inputs and outputs using efficient string-matching algorithms (e.g., Aho-Corasick). It supports exact, fuzzy, multilingual, and regex-based matching with configurable exceptions. It enables high-throughput real-time filtering but may be limited against synonyms or obfuscation.

A semantic detection guardrail can use transformer models and embeddings to detect harmful content by meaning rather than literal terms. It supports paraphrase detection, euphemism recognition, and adaptive few-shot learning for new threats. Configurable thresholds and context windows improve detection accuracy compared to keyword-based filtering.

A content moderation guardrail can detect harmful or policy-violating content across text, images, and media. It can use ensembles of specialized models (toxicity, hate speech, violence, explicit content) with weighted scoring. Bias mitigation, fairness auditing, and human-in-the-loop feedback improve robustness. Granular policies, detailed logging, and explainability features support compliance and transparent governance.

Figure 11:
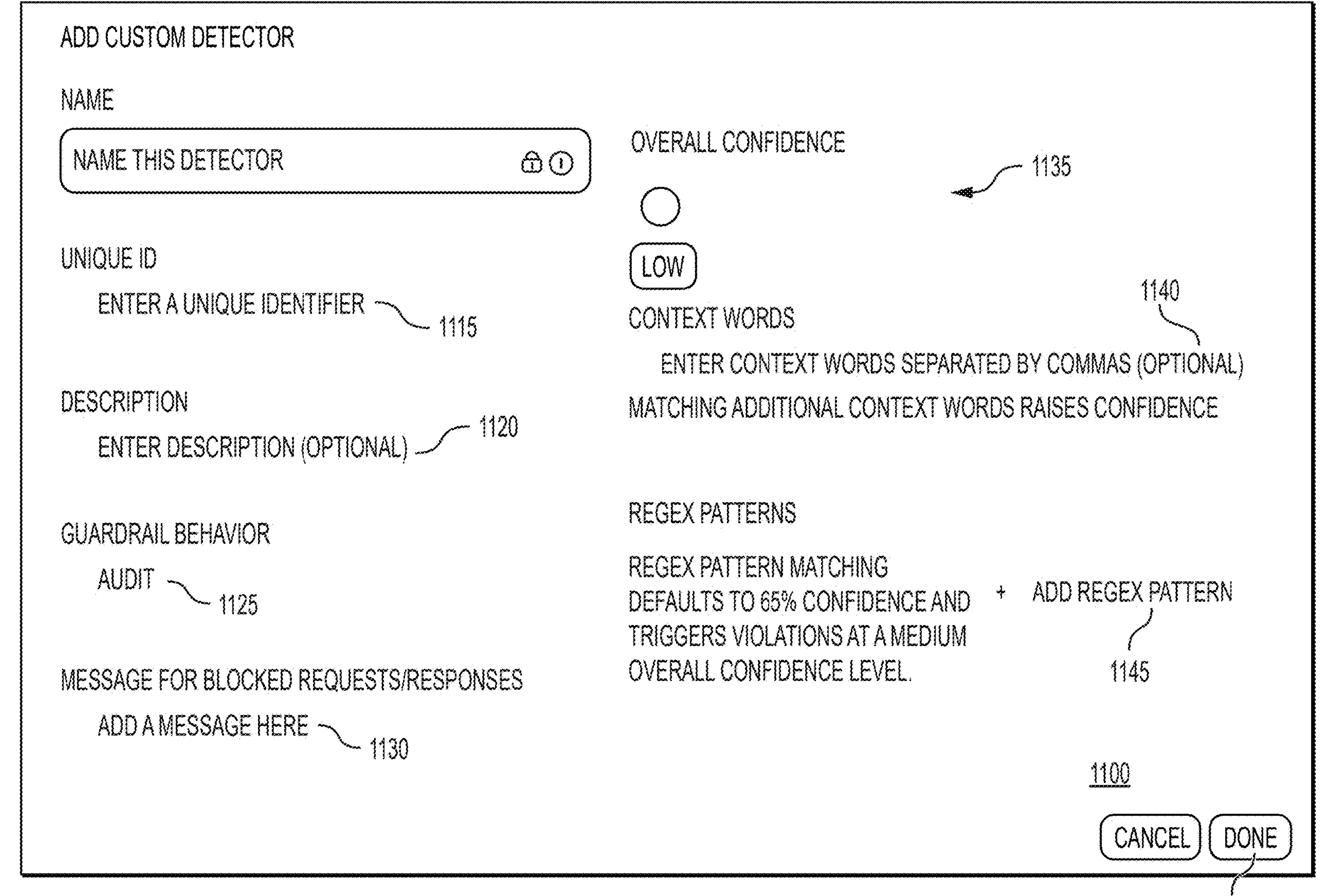
FIG. 11 is an illustration of a UI for customizing security rules related to detection, which can be implemented as part of the guardrails.

FIG. 11 is an illustration of a UI for customizing security rules related to detection, which can be implemented as part of the guardrails. Using screen 1100, an administrative user can define a custom detector. The custom detector can be added to security rules, such as guardrails, for evaluation during AI agent operation. The custom detector can be named and saved by the administrative user.

The screen 1100 allows the administrative user to enter a unique identifier in field 1115 and a description in field 1120. This can help the administrative user or other users identify the detector and either include or remove it from the security rules being applied to an AI agent.

Field 1125 allows the administrative user to select or define a guardrail behavior type for the detector. This can allow the grouping of detectors and other security rules by type.

Additionally, field 1130 allows for defining a response message that is delivered when the detector causes a blocked or modified request. This can allow a user or an AI agent to understand why the request was blocked or modified.

Option 1135 allows for selecting the overall confidence level needed for a positive detection when the detector is applied to an input. In this example, option 1135 is a slider that is currently in a "low" confidence position. This means that the threshold for detection will be set lower for this detector within a range of potential detection thresholds.

Field 1140 allows for setting context words. These are words that will commonly apply to the subject matter being detected by the detector. The security rules engine can compare a request (e.g., input or output) to the context words, scoring for direct hits and also for semantically similar hits in an example.

Button 1145 allows for adding regular expression (regex) patterns to the detector. A regex is a structured sequence of characters that defines a search rule for matching text. Regex patterns allow an administrator to specify precise or flexible rules for spotting words, phrases, or character sequences that should be flagged, removed, or replaced. Regex can catch variations rather than only exact terms. When the user is done with the settings, they can be saved with button 1150.

Figure 12:
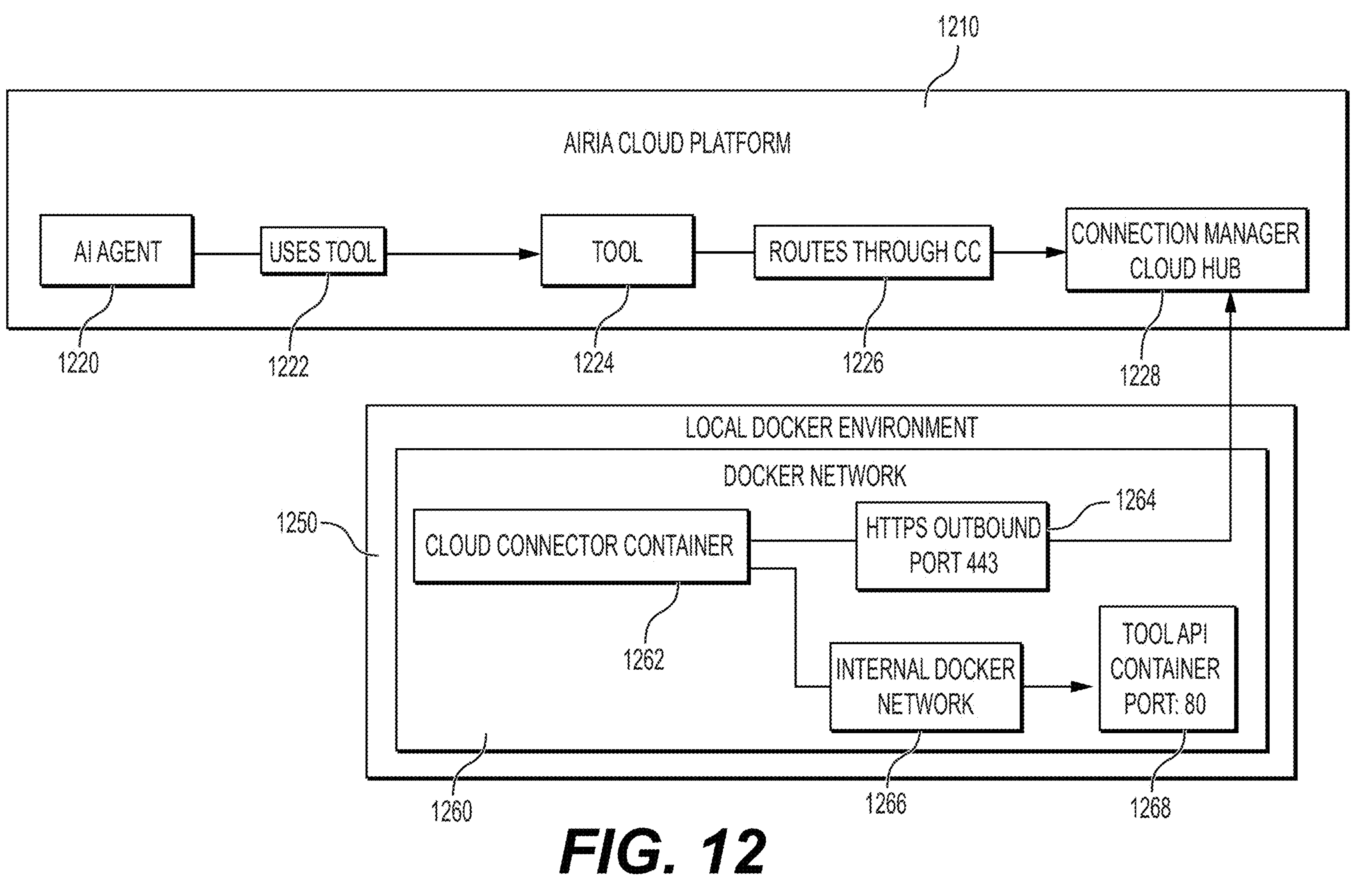
FIG. 12 is an illustration of system components for executing a cloud connector in a container as part of accessing a tool for use with an AI agent.

FIG. 12 is an illustration of system components for executing a cloud connector in a docker network as part of accessing a tool for use with an AI agent. Again, the cloud connector acts as a secure background service daemon that enables communication between private networks and the AI platform 1210. The AI platform 1210 can utilize a connection manager to communicate with a tool API in a local docker environment of a remote device.

The AI platform 1210, such as a gateway server, can execute an AI Agent at stage 1220. An agent executor can read the manifest file and determine the AI agent utilizes a tool at stage 1222. The agent executor can issue a resource command destined for the tool 1224. At stage 1226, the tool execution is routed through a cloud connector. This is performed by the connection manager at stage 1228.

In this example, the cloud connector executes in a cloud connector container at stage 1262. This occurs within a docker network 1260 of a local Docker environment 1250, which can exist at a remote device. The AI platform 1210 can utilize that local Docker environment to execute network-isolated components that service the AI agent's tool access. The local Docker environment 1250 can instantiate a cloud connector container at stage 1262 that originates all communications to the platform or service endpoints using an HTTPS outbound port (e.g., port 443) at stage 1264. By originating contact outbound from the local environment, no inbound firewall ports need be opened at the client network, while a mutually authenticated, encrypted session (e.g., a secure tunnel) carries control and data traffic. The first such outbound request can be authenticated by the AI platform, and which point the connection manager can open a socket connection as part of instantiating a secure tunnel.

The Docker environment 1250 can include a docker network 1260 in which internal Docker network 1266 locations are established. The internal Docker network 1266 provides address-scoped connectivity among co-resident containers, while remaining non-routable from external networks. Within this internal network 1266, the cloud connector container forwards requests to a tool API container that exposes an application port (e.g., port 80) for inter-container HTTP traffic. Because both containers are part of the internal Docker network 1266, at stage 1268 the tool API container's port 80 is reachable only from peers on that network (e.g., the cloud connector), not from the public internet or the host's external interfaces.

The cloud connector can report available tools within the local docker network to the cloud manager. This can allow an administrator to configure use of those private tools within the AI agent. For example, the UI from the AI platform can populate the available tools based on what is reported by the cloud connector. In general the Docker container can be instantiated with a script, and services can then be run within the container. A script can also check the status of all services, which can be reported back to the AI platform.

In operation, the AI agent resolves a tool route at the AI platform and the AI platform (via a connection manager) directs the request over the secure tunnel to the cloud connector container. The cloud connector performs policy enforcement and mediation, then at stage 1268 relays the request across the internal Docker network 1266 to the tool API container on port 80. The tool API container generates a response (e.g., invoking a local SDK or upstream SaaS), and the cloud connector returns the result to the platform exclusively over outbound HTTPS (port 443), preserving network isolation between external services and the tool container.

The arrangement can include auxiliary components such as a connection manager (also called a cloud hub) that orchestrates container lifecycle, enforces security rules and guardrails, and maintains audit logs, while the Docker network 1260 boundary prevents direct exposure of the tool API container to untrusted networks. This enables secure, auditable, and policy-compliant tool access for AI agents, with the platform retaining centralized oversight and the client retaining strict egress-only network posture.

In some examples, the same secure-tunnel, egress-only posture used with the cloud connector is also employed by broader AI platform integrations, allowing resources on a private customer network to be accessed without opening inbound ports, yet still supporting confidentiality, integrity, replay protection, and manifest-driven policy enforcement across agent inputs and outputs.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for deploying artificial intelligence ("AI") agents over secure cloud connections, comprising:

transmitting a cloud connector installer to a remote device, the cloud connector installer being transmitted from an AI platform, the cloud connector installer causing a cloud connector to be installed at the remote device;

receiving, from the cloud connector executing at the remote device, an authentication request;

in response to the authentication request, opening a first secure tunnel between the cloud connector and a connection manager of the AI platform, wherein opening the first secure tunnel comprises receiving, at the connection manager, a socket connection originating from the cloud connector at the remote device, and wherein the first secure tunnel is established exclusively through an outbound connection from the remote device, the first secure tunnel multiplexing, over the socket connection, a plurality of substreams comprising a control-plane substream, a data-plane substream, and a telemetry substream;

receiving, from the remote device over the first secure tunnel, a request to execute an AI agent at the remote device;

determining a compliance status of the remote device, wherein the compliance status is determined by applying security rules for local execution of the AI agent;

based on the compliance status and the request, modifying a manifest file of the AI agent, wherein the modified manifest file identifies an agent object within a network of the remote device, the agent object comprising at least one of an AI model, a vector database, and a dataset;

querying the remote device over the secure tunnel to determine whether the remote device has access to the agent object;

transmitting the manifest file over the secure tunnel to the remote device, wherein an agent executor executes the AI agent according to the manifest file; and receiving an execution record of the AI agent over the secure tunnel.

2. The method of claim 1, further comprising, based on the querying, determining whether to send the agent object or an object configuration to the remote device, wherein the object configuration allows the remote device to interact with the agent object, the object configuration comprising an endpoint and credentials for the agent object.

3. The method of claim 1, further comprising transmitting an agent executor to the remote device, the agent executor being configured to execute the AI agent according to the manifest file.

4. The method of claim 1, further comprising:
determining the compliance status of the remote device has changed; and
making an additional modification to the manifest file based on the changed compliance status.

5. The method of claim 1, comprising:
receiving data over the secure tunnel, the data being an input to or an output from the agent object;
modifying the data with guardrails; and
transmitting, over the secure tunnel, the modified data to the cloud connector, wherein the modified data invokes further execution of the AI agent.

6. The method of claim 5, wherein the guardrails are configured to detect in the data at least one of prompt injection and personally identifiable information ("PII").

7. The method of claim 1, further comprising:
transmitting, over the secure tunnel, a management profile to the remote device, wherein a conditional operation of an agent executor is invoked based on compliance with the management profile by the remote device or a user device interacting with the AI agent.

8. The method of claim 7, wherein the management profile defines which of the security rules are invoked by the agent executor.

9. The method of claim 1, wherein the manifest is modified by prioritizing the agent object relative to a second agent object at the AI platform.

10. The method of claim 1, wherein transmitting the cloud connector installer comprises transmitting a command to the remote device, wherein the command instructs the remote device on where to access the cloud connector installer.

11. The method of claim 10, wherein the command is sent to a docker environment, causing the docker environment to fetch the cloud connector installer.

12. The method of claim 1, further comprising configuring the AI agent, wherein configuring the AI agent comprises:
receiving, over the secure tunnel, identification of multiple agent objects that are within the network of the remote device;
invoking display of a user interface ("UI") that comprises options to select and connect one or more of the multiple agent objects; and
receiving a selection to add the agent object to the AI agent.

13. The method of claim 12, wherein the UI comprises options to select and connect additional agent objects that are outside of the network of the remote device.

14. The method of claim 13, wherein a second agent object is added to the AI agent, and wherein the second agent object is accessed or executed by the AI platform.

15. The method of claim 12, wherein the manifest file is automatically generated based on the selected and connected one or more of the multiple agent objects.

16. The method of claim 1, wherein deployment of the AI agent is contingent on prior simulated execution of the AI agent at the AI platform, and wherein simulating execution comprises:
invoking display of a user interface ("UI") that receives inputs for the AI agent; and
invoking display of outputs for the AI agent based on the received inputs.

17. The method of claim 1, further comprising logging the request from the agent executor.

18. The method of claim 17, further comprising logging context of the request, the context identifying a user and the AI agent, wherein the context is received over the secure tunnel from the cloud connector.

19. A non-transitory, computer-readable medium containing instructions for deploying artificial intelligence ("AI") agents over secure cloud connections, wherein the instructions are executed by at least one processor to perform stages comprising:
transmitting a cloud connector installer to a remote device, the cloud connector installer being transmitted from an AI platform, the cloud connector installer causing a cloud connector to be installed at the remote device;
receiving, from the cloud connector executing at the remote device, an authentication request;
in response to the authentication request, opening a first secure tunnel between the cloud connector and a connection manager of the AI platform, wherein opening the first secure tunnel comprises receiving, at the connection manager, a socket connection originating from the cloud connector at the remote device, and wherein the first secure tunnel is established exclusively through an outbound connection from the remote device, the first secure tunnel multiplexing, over the socket connection, a plurality of substreams comprising a control-plane substream, a data-plane substream, and a telemetry substream;
receiving, from the remote device over the first secure tunnel, a request to execute an AI agent at the remote device;
determining a compliance status of the remote device, wherein the compliance status is determined by applying security rules for local execution of the AI agent;
based on the compliance status and the request, modifying a manifest file of the AI agent, wherein the modified manifest file identifies an agent object within a network of the remote device, the agent object comprising at least one of an AI model, a vector database, and a dataset;
querying the remote device over the secure tunnel to determine whether the remote device has access to the agent object;
transmitting the manifest file over the secure tunnel to the remote device, wherein an agent executor executes the AI agent according to the manifest file; and
receiving an execution record of the AI agent over the secure tunnel.

20. A system for deploying artificial intelligence ("AI") agents over secure cloud connections, the system comprising:
at least one physical non-transitory, computer-readable medium comprising instructions; and
at least one processor that executes the instructions to perform stages comprising:
transmitting a cloud connector installer to a remote device, the cloud connector installer being transmitted from an AI platform, the cloud connector installer causing a cloud connector to be installed at the remote device;
receiving, from the cloud connector executing at the remote device, an authentication request;
in response to the authentication request, opening a first secure tunnel between the cloud connector and a connection manager of the AI platform, wherein opening the first secure tunnel comprises receiving, at the connection manager, a socket connection originating from the cloud connector at the remote device, and wherein the first secure tunnel is established exclusively through an outbound connection from the remote device, the first secure tunnel multiplexing, over the socket connection, a plurality of substreams comprising a control-plane substream, a data-plane substream, and a telemetry substream;

receiving, from the remote device over the first secure tunnel, a request to execute an AI agent at the remote device;

determining a compliance status of the remote device, wherein the compliance status is determined by applying security rules for local execution of the AI agent;

based on the compliance status and the request, modifying a manifest file of the AI agent, wherein the modified manifest file identifies an agent object within a network of the remote device, the agent object comprising at least one of an AI model, a vector database, and a dataset;

querying the remote device over the secure tunnel to determine whether the remote device has access to the agent object;

transmitting the manifest file over the secure tunnel to the remote device, wherein an agent executor executes the AI agent according to the manifest file; and receiving an execution record of the AI agent over the secure tunnel.

* * * * *